United States Patent
Zhamu et al.

(10) Patent No.: US 11,721,832 B2
(45) Date of Patent: Aug. 8, 2023

(54) ELASTOMER COMPOSITE-ENCAPSULATED PARTICLES OF ANODE ACTIVE MATERIALS FOR LITHIUM BATTERIES

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 365 days.

(21) Appl. No.: 15/903,788

(22) Filed: Feb. 23, 2018

(65) Prior Publication Data
US 2019/0267662 A1    Aug. 29, 2019

(51) Int. Cl.
*H01M 10/0525*    (2010.01)
*H01M 4/133*    (2010.01)
(Continued)

(52) U.S. Cl.
CPC ....... *H01M 10/0525* (2013.01); *H01M 4/133* (2013.01); *H01M 4/622* (2013.01); *H01M 2004/027* (2013.01)

(58) Field of Classification Search
CPC ..... H01M 10/0525; H01M 4/133–622; H01M 2004/027
See application file for complete search history.

(56) References Cited

U.S. PATENT DOCUMENTS

| 2,798,878 A | 7/1957 | Hummers |
| 3,836,511 A | 9/1974 | O'farrell et al. |

(Continued)

FOREIGN PATENT DOCUMENTS

| CN | 103258990 A | 8/2013 |
| CN | 105322132 A | 2/2016 |

(Continued)

OTHER PUBLICATIONS

Karlicky et al., "Halogenated Graphenes: Rapidly Growing Family of Graphene Derivatives" ACS Nano (2013) vol. 7, No. 8, pp. 6434-6464.

(Continued)

*Primary Examiner* — Osei K Amponsah

(57) ABSTRACT

Provided is an anode active material layer for a lithium battery. This layer comprises multiple particulates of an anode active material, wherein at least a particulate is composed of one or a plurality of particles of an anode active material being encapsulated by a thin layer of graphene/elastomer composite having from 0.01% to 50% by weight of graphene sheets dispersed in an elastomeric matrix material, wherein the encapsulating shell (the thin layer of composite) has a thickness from 1 nm to 10 μm and the graphene/elastomer composite has a lithium ion conductivity from $10^{-7}$ S/cm to $10^{-2}$ S/cm and an electrical conductivity from $10^{-7}$ S/cm to 100 S/cm when measured at room temperature. The anode active material is preferably selected from Si, Ge, Sn, $SnO_2$, $SiO_x$, $Co_3O_4$, $Mn_3O_4$, etc., which has a specific capacity of lithium storage greater than 372 mAh/g (the theoretical lithium storage limit of graphite).

20 Claims, 7 Drawing Sheets

(51) Int. Cl.
*H01M 4/62* (2006.01)
*H01M 4/02* (2006.01)

(56) References Cited

U.S. PATENT DOCUMENTS

| | | | |
|---|---|---|---|
| 4,720,910 A | 1/1988 | Rourke et al. | |
| 5,057,339 A | 10/1991 | Ogawa | |
| 5,270,417 A | 12/1993 | Soga et al. | |
| 5,342,710 A | 8/1994 | Koksbang | |
| 5,350,647 A | 9/1994 | Hope et al. | |
| 5,409,785 A | 4/1995 | Nakano et al. | |
| 5,424,151 A | 6/1995 | Koksbang et al. | |
| 5,434,021 A | 7/1995 | Fauteux et al. | |
| 5,460,905 A | 10/1995 | Skotheim | |
| 5,536,599 A | 7/1996 | Alamgir et al. | |
| 5,648,187 A | 7/1997 | Skotheim | |
| 5,961,672 A | 10/1999 | Skotheim et al. | |
| 6,025,094 A | 2/2000 | Visco et al. | |
| 6,218,055 B1 | 4/2001 | Shah et al. | |
| 6,447,952 B1 | 9/2002 | Spiegel et al. | |
| 6,451,484 B1 | 9/2002 | Han et al. | |
| 6,475,678 B1 | 11/2002 | Suzuki | |
| 6,515,101 B1 | 2/2003 | Sheares | |
| 6,620,547 B1 | 9/2003 | Sung et al. | |
| 6,733,924 B1 | 5/2004 | Skotheim et al. | |
| 6,797,428 B1 | 9/2004 | Skotheim et al. | |
| 6,936,381 B2 | 8/2005 | Skotheim et al. | |
| 7,247,408 B2 | 7/2007 | Skotheim et al. | |
| 7,282,295 B2 | 10/2007 | Visco et al. | |
| 7,282,296 B2 | 10/2007 | Visco et al. | |
| 7,282,302 B2 | 10/2007 | Visco et al. | |
| 7,618,678 B2 | 11/2009 | Mao et al. | |
| 8,597,828 B2 | 12/2013 | Martinet et al. | |
| 9,905,856 B1 | 2/2018 | Zhamu et al. | |
| 10,084,182 B2 | 9/2018 | Pan et al. | |
| 10,483,533 B2 | 11/2019 | Zhamu et al. | |
| 10,629,899 B1 | 4/2020 | Jang | |
| 2002/0034685 A1 | 3/2002 | Sato et al. | |
| 2002/0182488 A1 | 12/2002 | Cho et al. | |
| 2002/0195591 A1 | 12/2002 | Ravet et al. | |
| 2003/0180619 A1 | 9/2003 | Tamura et al. | |
| 2004/0018430 A1* | 1/2004 | Holman | H01M 4/62 429/232 |
| 2005/0034993 A1 | 2/2005 | Gozdz et al. | |
| 2005/0098914 A1 | 5/2005 | Varma et al. | |
| 2005/0118508 A1 | 6/2005 | Yong et al. | |
| 2005/0136330 A1 | 6/2005 | Mao et al. | |
| 2006/0263697 A1 | 11/2006 | Dahn et al. | |
| 2007/0218369 A1 | 9/2007 | Kaiduka et al. | |
| 2007/0289879 A1 | 12/2007 | Horton | |
| 2008/0248393 A1 | 10/2008 | Richard et al. | |
| 2008/0318128 A1 | 12/2008 | Simoneau et al. | |
| 2009/0136846 A1* | 5/2009 | Lee | H01M 50/446 429/217 |
| 2009/0155676 A1 | 6/2009 | Zhamu et al. | |
| 2009/0169725 A1 | 7/2009 | Zhamu et al. | |
| 2010/0099029 A1 | 4/2010 | Kinoshita et al. | |
| 2010/0112454 A1 | 5/2010 | Visco et al. | |
| 2010/0143798 A1 | 6/2010 | Zhamu et al. | |
| 2010/0173198 A1 | 7/2010 | Zhamu et al. | |
| 2011/0059361 A1 | 3/2011 | Wilkening et al. | |
| 2011/0104571 A1 | 5/2011 | Zhamu et al. | |
| 2011/0143211 A1 | 6/2011 | Takeyama | |
| 2011/0177388 A1 | 7/2011 | Bae et al. | |
| 2011/0244337 A1 | 10/2011 | Ohta et al. | |
| 2011/0262816 A1 | 10/2011 | Amatucci | |
| 2012/0064409 A1* | 3/2012 | Zhamu | H01M 4/483 252/502 |
| 2012/0070708 A1 | 3/2012 | Ohira et al. | |
| 2012/0088154 A1 | 4/2012 | Liu et al. | |
| 2013/0052544 A1 | 2/2013 | Ohkubo et al. | |
| 2013/0054061 A1 | 2/2013 | Nishimoto | |
| 2013/0157141 A1 | 6/2013 | Zhong et al. | |
| 2013/0164615 A1 | 6/2013 | Manthiram et al. | |
| 2013/0171339 A1 | 7/2013 | Wang et al. | |
| 2013/0224603 A1 | 8/2013 | Chen et al. | |
| 2013/0292613 A1 | 11/2013 | Wegner et al. | |
| 2014/0072879 A1 | 3/2014 | Chen et al. | |
| 2014/0147738 A1 | 5/2014 | Chen et al. | |
| 2014/0147751 A1 | 5/2014 | Yang et al. | |
| 2014/0154572 A1 | 6/2014 | Singh et al. | |
| 2014/0162121 A1 | 6/2014 | Ryu et al. | |
| 2014/0178747 A1 | 6/2014 | Tsai et al. | |
| 2014/0234702 A1 | 8/2014 | Zhang et al. | |
| 2014/0235513 A1 | 8/2014 | Kverel et al. | |
| 2014/0363746 A1 | 12/2014 | He et al. | |
| 2015/0044556 A1 | 2/2015 | Wang et al. | |
| 2015/0064568 A1 | 3/2015 | Yushin et al. | |
| 2015/0064574 A1 | 3/2015 | He et al. | |
| 2015/0079485 A1 | 3/2015 | Choi et al. | |
| 2015/0162641 A1 | 6/2015 | Visco et al. | |
| 2015/0180000 A1 | 6/2015 | Roumi | |
| 2015/0180037 A1 | 6/2015 | Gronwald et al. | |
| 2015/0218323 A1 | 8/2015 | Kim et al. | |
| 2015/0221935 A1 | 8/2015 | Zhou et al. | |
| 2015/0236372 A1 | 8/2015 | Yushin et al. | |
| 2015/0244025 A1 | 8/2015 | Rhee et al. | |
| 2015/0318532 A1 | 11/2015 | Manthiram et al. | |
| 2015/0325844 A1 | 11/2015 | Inoue | |
| 2015/0372294 A1 | 12/2015 | Minami et al. | |
| 2016/0013481 A1 | 1/2016 | Jeong et al. | |
| 2016/0043384 A1 | 2/2016 | Zhamu et al. | |
| 2016/0087266 A1 | 3/2016 | Muldoon et al. | |
| 2016/0126543 A1 | 5/2016 | Ota et al. | |
| 2016/0149216 A1 | 5/2016 | Mizuno et al. | |
| 2016/0181611 A1 | 6/2016 | Cho et al. | |
| 2016/0204431 A1 | 7/2016 | Sawa | |
| 2016/0218341 A1 | 7/2016 | Kumar et al. | |
| 2016/0240896 A1 | 8/2016 | Zhang et al. | |
| 2016/0301075 A1 | 10/2016 | Zhamu et al. | |
| 2016/0344035 A1 | 11/2016 | Zhamu et al. | |
| 2016/0351877 A1 | 12/2016 | Kusachi et al. | |
| 2016/0351909 A1 | 12/2016 | Bittner et al. | |
| 2016/0372743 A1 | 12/2016 | Cho et al. | |
| 2016/0372784 A1 | 12/2016 | Hayner et al. | |
| 2017/0002154 A1 | 1/2017 | Hiasa et al. | |
| 2017/0018799 A1 | 1/2017 | Jeong | |
| 2017/0033357 A1* | 2/2017 | Cho | C01B 33/113 |
| 2017/0047584 A1 | 2/2017 | Hwang et al. | |
| 2017/0062830 A1 | 3/2017 | Bao et al. | |
| 2017/0092986 A1 | 3/2017 | Ogawa et al. | |
| 2017/0098824 A1 | 4/2017 | Fasching et al. | |
| 2017/0098856 A1 | 4/2017 | Zhamu et al. | |
| 2017/0104204 A1 | 4/2017 | Zhamu et al. | |
| 2017/0104217 A1 | 4/2017 | Yu et al. | |
| 2017/0117535 A1 | 4/2017 | Yoon et al. | |
| 2017/0117538 A1 | 4/2017 | Bendimerad et al. | |
| 2017/0117589 A1 | 4/2017 | Tajima et al. | |
| 2017/0141387 A1 | 5/2017 | Hayner et al. | |
| 2017/0141399 A1 | 5/2017 | Lux et al. | |
| 2017/0166722 A1 | 6/2017 | Zhamu et al. | |
| 2017/0179468 A1 | 6/2017 | Fanous et al. | |
| 2017/0194640 A1 | 7/2017 | Bucur et al. | |
| 2017/0194648 A1 | 7/2017 | Bucur et al. | |
| 2017/0200943 A1 | 7/2017 | Kawakami | |
| 2017/0207484 A1 | 7/2017 | Zhamu et al. | |
| 2017/0288211 A1* | 10/2017 | Zhamu | H01M 4/131 |
| 2017/0294643 A1* | 10/2017 | Burshtain | H01M 4/1395 |
| 2017/0309917 A1 | 10/2017 | Lee et al. | |
| 2017/0338472 A1 | 11/2017 | Zhamu et al. | |
| 2017/0338474 A1 | 11/2017 | Lee et al. | |
| 2017/0338490 A1 | 11/2017 | Xiao et al. | |
| 2018/0053978 A1 | 2/2018 | Song et al. | |
| 2018/0083265 A1 | 3/2018 | Singh et al. | |
| 2018/0190975 A1 | 7/2018 | Ishii et al. | |
| 2018/0219215 A1 | 8/2018 | Bucur et al. | |
| 2018/0233736 A1 | 8/2018 | Zhamu et al. | |
| 2018/0241031 A1 | 8/2018 | Pan et al. | |
| 2018/0241032 A1 | 8/2018 | Pan et al. | |
| 2018/0248173 A1 | 8/2018 | Pan et al. | |
| 2018/0277913 A1 | 9/2018 | Pan et al. | |
| 2018/0287142 A1 | 10/2018 | Zhamu et al. | |
| 2018/0294475 A1 | 10/2018 | Zhamu et al. | |
| 2018/0294476 A1 | 10/2018 | Zhamu et al. | |

(56) References Cited

U.S. PATENT DOCUMENTS

| | | |
|---|---|---|
| 2018/0301707 A1 | 10/2018 | Pan et al. |
| 2019/0051905 A1 | 2/2019 | Zhamu et al. |
| 2019/0058185 A1 | 2/2019 | Lee et al. |
| 2019/0077669 A1 | 3/2019 | Zhamu et al. |
| 2019/0081325 A1 | 3/2019 | Takeda et al. |
| 2019/0088958 A1 | 3/2019 | Viner et al. |
| 2019/0260028 A1 | 8/2019 | Zhamu et al. |
| 2019/0319303 A1 | 10/2019 | Kushida et al. |
| 2019/0386332 A1 | 12/2019 | Zhamu et al. |
| 2019/0393466 A1 | 12/2019 | Lin et al. |
| 2019/0393495 A1 | 12/2019 | He et al. |
| 2019/0393510 A1 | 12/2019 | He et al. |
| 2019/0393543 A1 | 12/2019 | Zhamu et al. |

FOREIGN PATENT DOCUMENTS

| | | |
|---|---|---|
| CN | 108899472 A | 11/2018 |
| EP | 2787563 A1 | 10/2014 |
| JP | 1275613 A | 11/1989 |
| JP | 2010160984 A | 7/2010 |
| JP | 2011524611 A | 9/2011 |
| JP | 2015084320 A | 4/2015 |
| JP | 2015176656 A | 10/2015 |
| KR | 1020030050475 A | 6/2003 |
| KR | 100670527 B1 | 1/2007 |
| KR | 1020100138607 A | 12/2010 |
| KR | 1020140101640 A | 8/2014 |
| KR | 20160052351 A | 5/2016 |
| KR | 1020160085386 A | 7/2016 |
| KR | 1020160087511 A | 7/2016 |
| KR | 1020170001069 U | 3/2017 |
| KR | 1020170086003 A | 7/2017 |
| KR | 1020170126404 A | 11/2017 |
| KR | 1020180035752 A | 4/2018 |
| WO | 2007108424 A1 | 9/2007 |
| WO | 2015141799 A1 | 9/2015 |
| WO | 2016015915 A1 | 2/2016 |
| WO | 2017172104 A1 | 10/2017 |
| WO | 2017200798 A1 | 11/2017 |
| WO | 2018075538 A1 | 4/2018 |
| WO | 2018148090 A1 | 8/2018 |

OTHER PUBLICATIONS

Choi et al., "Highly elastic binders integrating polyrotaxanes for silicon microparticle anodes in lithium ion batteries" Science (2017) vol. 357, No. 6348, pp. 279-283.
Habib et al., "Elastomeric Nanocomposite Based on Exfoliated Graphene Oxide and Its Characteristics without Vulcanization" Hindawi Journal of Nanomaterials (2017) vol. 2017, Article ID 8543137, 11 pages.
KR-10-2015-0044333 English language translation.
Liu et al., "Solutions for the problems of silicon-carbon anode materials for lithium-ion batteries" Royal Society Open Science (2018) vol. 5, p. 172370.
PCT/US18/25135 International Search Report and Written Opinion dated Jun. 27, 2018, 14 pages.
PCT/US18/25150 International Search Report and Written Opinion dated Jun. 29, 2018, 14 pages.
PCT/US18/25160 International Search Report and Written Opinion dated Nov. 21, 2018, 12 pages.
PCT/US18/25163 International Search Report and Written Opinion dated Jul. 27, 2018, 19 pages.
PCT/US18/43421 International Search Report and Written Opinion dated Oct. 11, 2018, 13 pages.
PCT/US18/43435 International Search Report and Written Opinion dated Jan. 7, 2019, 14 pages.
PCT/US19/18931 International Search Report and Written Opinion dated May 8, 2019, 13 pages.
PCT/US19/19061 International Search Report and Written Opinion dated May 13, 2019, 11 pages.
PCT/US19/20214 International Search Report and Written Opinion dated May 2, 2019, 7 pages.
PCT/US19/20222 International Search Report and Written Opinion dated May 3, 2019, 7 pages.
U.S. Appl. No. 14/999,080 Nonfinal Office Action dated Nov. 9, 2018.
U.S. Appl. No. 15/442,803 Nonfinal Office Action dated Dec. 28, 2018, 24 pages.
U.S. Appl. No. 15/442,807 Nonfinal Office Action dated Dec. 14, 2018, 7 pages.
U.S. Appl. No. 15/483,342 Final Office Action dated Mar. 22, 2019, 52 pages.
U.S. Appl. No. 15/483,342 Nonfinal Office Action dated Nov. 2, 2018, 37 pages.
U.S. Appl. No. 15/483,347 Final Office Action dated Apr. 16, 2019, 23 pages.
U.S. Appl. No. 15/483,347 Nonfinal Office Action dated Nov. 2, 2018, 20 pages.
U.S. Appl. No. 15/483,348 Final Office Action dated Apr. 9, 2019, 28 pages.
U.S. Appl. No. 15/483,348 Nonfinal Office Action dated Nov. 21, 2018, 22 pages.
Vaikhanski et al., "Fiber-reinforced composite foam from expandable PVC microspheres" Composites Part A (2003) vol. 34, pp. 1245-1253.
Wikipedia contributors. "Anode." Wikipedia, The Free Encyclopedia, Mar. 4, 2019, Web. Mar. 18, 2019. (Year: 2019).
Wikipedia contributors. "Molar mass distribution." Wikipedia, The Free Encyclopedia, Feb. 1, 2019, Web. Mar. 18, 2019. (Year: 2019).
PCT/US19/19062 International Search Report and Written Opinion dated May 13, 2019, 9 pages.
PCT/US19/21137 International Search Report and Written Opinion dated Jun. 18, 2019, 13 pages.
U.S. Appl. No. 15/901,367 Nonfinal Office Action dated Jun. 10, 2019, 12 pages.
An et al., "Diameter-Selected Synthesis of Single Crystalline Trigonal Selenium Nanowires" Materials Chemistry and Physics (2007) vol. 101, No. 2-3, pp. 357-361.
An et al., "Large-Scale Synthesis of High Quality Trigonal Selenium Nanowires" European Journal of Inorganic Chemistry (2003) vol. 17, pp. 3250-3255.
Arai et al., "Versatile supramolecular cross-linker: a rotaxane cross-linker that directly endows vinyl polymers with movable cross-links" Chemistry (2013) vol. 19, pp. 5917-5923.
Buonerba et al., "Novel Synthetic Strategy for the Sulfonation of Polybutadiene and Styrene-Butadiene Copolymers" Macromolecules (2013) vol. 46, pp. 778-784.
Chen et al., "Selenium nanowires and nanotubes synthesized via a facile template-free solution method" Materials Research Bulletin (2010) vol. 45, pp. 699-704.
Dwivedi et al., "An Organic Acid-induced Synthesis and Characterization of Selenium Nanoparticles" Journal of Nanotechnology (2011) Article ID 651971, 6 pages.
Elabd et al., "Sulfonation and Characterization of Poly(styrene-isobutylene-styrene) Triblock Copolymers at High Ion-Exchange Capacities" Polymer (2004) vol. 45, pp. 3037-3043.
Fan et al., "Hollow selenium encapsulated into 3D graphene hydrogels for lithium-selenium batteries with high rate performance and cycling stability" RSC Adv. (2017) vol. 7, pp. 21281-21286.
Gao et al., "Hollow Sphere Selenium Nanoparticles: Their In-Vitro Anti Hydroxyl Radical Effect" Advanced Materials (2002), vol. 14, No. 4, pp. 290-293.
Ji et al., "A highly ordered nanostructured carbon-sulphur cathode for lithium-sulphur batteries" Nature Materials (2009) vol. 8, pp. 500-506.
Li et al., "Mixed Surfactant Template Method for Preparation of Nanometer Selenium" E-Journal of Chemistry (2009) vol. 6, No. S1, pp. S304-S310.
Lin et al., "Observation in the Growth of Selenium Nanoparticles" Journal of Chinese Chemical Society (2004) vol. 51, No. 2, pp. 239-242.

(56) References Cited

OTHER PUBLICATIONS

Luesakul et al., "Shape-controlled synthesis of cubic-like selenium nanoparticles via the self-assembly method" Carbohydrate Polymers (2016) vol. 153, pp. 435-444.
PCT/US17/18452 International Search Report and Written Opinion dated Apr. 25, 2017, 9 pages.
PCT/US18/16404 International Search Report and Written Opinion dated Apr. 13, 2018, 11 pages.
PCT/US18/16410 International Search Report and Written Opinion dated Apr. 20, 2018, 10 pages.
PCT/US18/16418 International Search Report and Written Opinion dated Apr. 25, 2018, 9 pages.
PCT/US18/16423 International Search Report and Written Opinion dated Apr. 24, 2018, 9 pages.
PCT/US18/16426 International Search Report and Written Opinion dated Apr. 24, 2018, 9 pages.
PCT/US18/16431 International Search Report and Written Opinion dated Apr. 26, 2018, 6 pages.
PCT/US18/20892 International Search Report and Written Opinion dated May 2, 2018, 6 pages.
Xie et al., "A Novel Method for Synthesis of Sulfonated SBS Ionomers by Ring-Opening Reaction of Epoxidized SBS, Their Characterization, Properties, and Blends" Journal of Elastomers and Plastics (2007) vol. 39, pp. 317-334.
Zeng et al., "Solvothermal synthesis of trigonal selenium with butterfly-like microstructure" Particuology (2013) vol. 11, No. 5, pp. 614-617.
Zhang et al., "Synthesis of selenium nanoparticles in the presence of polysaccharides" Materials Letters (2004) vol. 58, No. 21, pp. 2590-2594.
U.S. Appl. No. 16/010,975 Nonfinal Office Action dated Jan. 8, 2020, 5 pages.
U.S. Appl. No. 16/014,623 Final Office Action dated Apr. 9, 2020, 14 pages.
U.S. Appl. No. 16/014,623 Nonfinal Office Action dated Oct. 4, 2019, 8 pages.
U.S. Appl. No. 16/017,294 Nonfinal Office Action dated Jan. 23, 2020, 6 pages.
U.S. Appl. No. 16/112,208 Nonfinal Office Action dated Apr. 2, 2020, 7 pages.
U.S. Appl. No. 16/112,225 Nonfinal Office Action dated May 13, 2020, 9 pages.
U.S. Appl. No. 16/113,676 Nonfinal Office Action dated Oct. 4, 2019, 9 pages.
U.S. Appl. No. 16/113,676 Final Office Action dated Apr. 9, 2020, 15 pages.
U.S. Appl. No. 16/114,959 Final Office Action dated Jul. 22, 2020, 6 pages.
U.S. Appl. No. 16/116,329 Final Office Action dated Jul. 23, 2020, 6 pages.
U.S. Appl. No. 16/116,329 Nonfinal Office Action dated Mar. 30, 2020, 6 pages.
U.S. Appl. No. 16/116,341 Final Office Action dated Jul. 23, 2020, 6 pages.
U.S. Appl. No. 16/116,341 Nonfinal Office Action dated Mar. 30, 2020, 6 pages.
U.S. Appl. No. 16/120,875 Final Office Action dated Apr. 9, 2020, 14 pages.
U.S. Appl. No. 16/120,875 Nonfinal Office Action dated Oct. 4, 2019, 10 pages.
U.S. Appl. No. 16/123,218 Final Office Action dated Apr. 9, 2020, 13 pages.
U.S. Appl. No. 16/123,218 Nonfinal Office Action dated Oct. 4, 2019, 9 pages.
U.S. Appl. No. 16/126,736 Final Office Action dated Jul. 23, 2020, 6 pages.
U.S. Appl. No. 16/126,736 Nonfinal Office Action dated Mar. 30, 2020, 6 pages.
U.S. Appl. No. 16/126,745 Final Office Action dated Jul. 23, 2020, 6 pages.
U.S. Appl. No. 16/126,745 Nonfinal Office Action dated Mar. 30, 2020, 6 pages.
U.S. Appl. No. 16/160,257 Nonfinal Office Action dated Apr. 3, 2020, 16 pages.
U.S. Appl. No. 16/166,536 Nonfinal Office Action dated May 14, 2020, 5 pages.
U.S. Appl. No. 16/166,574 Final Office Action dated Apr. 9, 2020, 12 pages.
U.S. Appl. No. 16/166,574 Nonfinal Office Action dated Oct. 4, 2019, 9 pages.
U.S. Appl. No. 16/238,052 Nonfinal Office Action dated Apr. 3, 2020, 14 pages.
U.S. Appl. No. 16/238,061 Nonfinal Office Action dated Aug. 14, 2020, 8 pages.
U.S. Appl. No. 16/256,321 Nonfinal Office Action dated Jul. 27, 2020, 8 pages.
U.S. Appl. No. 16/256,346 Nonfinal Office Action dated May 19, 2020, 16 pages.
"Nylon" en.wikipedia.org/wiki/Nylon. Accessed Feb. 18, 2020 (Year: 2020).
AZO Materials Table of Properties on Styrene Butadiene Rubber, 5 pages.
PCT/US19/27147 International Search Report and Written Opinion dated Aug. 1, 2019, 16 pages.
PCT/US19/36748 International Search Report and Written Opinion dated Oct. 16, 2019, 11 pages.
PCT/US19/37690 International Search Report and Written Opinion dated Oct. 18, 2019, 18 pages.
PCT/US19/37692 International Search Report and Written Opinion dated Oct. 21, 2019, 18 pages.
PCT/US19/37700 International Search Report and Written Opinion dated Oct. 23, 2019, 17 pages.
PCT/US19/38367 International Search Report and Written Opinion dated Oct. 18, 2019, 17 pages.
PCT/US19/38368 International Search Report and Written Opinion dated Oct. 18, 2019, 18 pages.
PCT/US19/38436 International Search Report and Written Opinion dated Oct. 16, 2019, 17 pages.
PCT/US19/38455 International Search Report and Written Opinion dated Oct. 18, 2019, 10 pages.
PCT/US19/38456 International Search Report and Written Opinion dated Oct. 16, 2019, 16 pages.
PCT/US19/38881 International Search Report and Written Opinion dated Oct. 18, 2019, 14 pages.
PCT/US19/47642 International Search Report and Written Opinion dated Dec. 6, 2019, 16 pages.
PCT/US19/48084 International Search Report and Written Opinion dated Dec. 16, 2019, 9 pages.
PCT/US19/55758 International Search Report and Written Opinion dated Jan. 31, 2020, 15 pages.
PCT/US20/14869 International Search Report and Written Opinion dated May 19, 2020, 13 pages.
U.S. Appl. No. 14/999,080 Nonfinal Office Action dated Oct. 30, 2019, 15 pages.
U.S. Appl. No. 15/434,632 Final Office Action dated Dec. 26, 2019, 20 pages.
U.S. Appl. No. 15/434,632 Nonfinal Office Action dated Jun. 26, 2020, 19 pages.
U.S. Appl. No. 15/442,278 Final Office Action dated Oct. 21, 2019, 16 pages.
U.S. Appl. No. 15/442,278 Nonfinal Office Action dated Feb. 28, 2020, 16 pages.
U.S. Appl. No. 15/442,803 Final Office Action dated Feb. 24, 2020, 36 pages.
U.S. Appl. No. 15/442,803 Nonfinal Office Action dated Jul. 20, 2020, 8 pages.
U.S. Appl. No. 15/442,803 Nonfinal Office Action dated Jul. 25, 2019, 37 pages.
U.S. Appl. No. 15/478,125 Final Office Action dated Aug. 23, 2019, 14 pages.
U.S. Appl. No. 15/478,125 Nonfinal Office Action dated Mar. 5, 2020, 11 pages.

(56) References Cited

OTHER PUBLICATIONS

U.S. Appl. No. 15/483,347 Final Office Action dated Dec. 27, 2019, 22 pages.
U.S. Appl. No. 15/483,347 Nonfinal Office Action dated Jun. 17, 2020, 14 pages.
U.S. Appl. No. 15/483,347 Nonfinal Office Action dated Sep. 17, 2019, 20 pages.
U.S. Appl. No. 15/483,348 Advisory Action dated Jul. 18, 2019, 9 pages.
U.S. Appl. No. 15/483,348 Final Office Action dated Jan. 20, 2020, 9 pages.
U.S. Appl. No. 15/483,348 Nonfinal Office Action dated Sep. 16, 2019, 22 pages.
U.S. Appl. No. 15/485,934 Nonfinal Office Action dated May 26, 2020, 12 pages.
U.S. Appl. No. 15/676,677 Nonfinal Office Action dated Feb. 5, 2020, 15 pages.
U.S. Appl. No. 15/676,680 Nonfinal Office Action dated May 20, 2020, 8 pages.
U.S. Appl. No. 15/903,808 Final Office Action dated May 15, 2020, 9 pages.
U.S. Appl. No. 15/903,808 Nonfinal Office Action dated Jan. 28, 2020, 8 pages.
U.S. Appl. No. 15/910,465 Final Office Action dated May 15, 2020, 13 pages.
U.S. Appl. No. 15/910,465 Nonfinal Office Action dated Nov. 1, 2019, 12 pages.
U.S. Appl. No. 15/910,471 Nonfinal Office Action dated May 13, 2020, 11 pages.
U.S. Appl. No. 15/910,471 Non-final Office Action dated Nov. 8, 2019, 12 pages.
U.S. Appl. No. 15/914,216 Final Office Action dated Dec. 19, 2019, 9 pages.
U.S. Appl. No. 15/954,088 Final Office Action dated Aug. 7, 2020, 8 pages.
U.S. Appl. No. 15/954,088 Nonfinal Office Action dated Mar. 13, 2020, 9 pages.
U.S. Appl. No. 16/010,213 Final Office Action dated Jun. 15, 2018, 10 pages.
U.S. Appl. No. 16/010,213 Nonfinal Office Action dated Mar. 27, 2020, 12 pages.
U.S. Appl. No. 16/010,225 Final Office Action dated Jul. 8, 2020, 7 pages.
U.S. Appl. No. 16/010,225 Nonfinal Office Action dated Mar. 27, 2020, 13 pages.
U.S. Appl. No. 16/010,965 Nonfinal Office Action dated Jan. 8, 2020, 5 pages.

\* cited by examiner

ELASTOMER COMPOSITE-ENCAPSULATED PARTICLES OF ANODE ACTIVE MATERIALS FOR LITHIUM BATTERIES

FIELD OF THE INVENTION

The present disclosure relates generally to the field of rechargeable lithium battery and, more particularly, to the anode active materials in the form of elastomer-graphene composite-encapsulated particles and the process for producing same.

BACKGROUND OF THE INVENTION

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the binder layer is used to bond the anode active material (e.g. graphite or Si particles) and a conductive filler (e.g. carbon black or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode layer and the latter one forms another discrete layer.

The most commonly used anode active materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. these positive ions can no longer be shuttled back and forth between the anode and the cathode during charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies 0<a≤5) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

To overcome the problems associated with such mechanical degradation, three technical approaches have been proposed:
(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.
(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.
(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles. Presumably, the protective matrix provides a cushioning effect for particle expansion or shrinkage, and prevents the electrolyte from contacting and reacting with the electrode active material. Examples of high-capacity anode active particles are Si, Sn, and $SnO_2$. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conducting (e.g., ceramic or oxide coating). Ideally, the protective material should meet the following requirements: (a) The coating or matrix material should be of high strength and stiffness so that it can help to refrain the electrode active material particles, when lithiated, from expanding to an excessive extent. (b) The protective material should also have high fracture toughness or high resistance to crack formation to avoid disintegration during repeated cycling. (c) The protective material must be inert (inactive) with respect to the electrolyte, but be a good lithium ion conductor. (d) The protective material must not provide any significant amount of defect sites that irreversibly trap lithium ions. (e) The protective material must be lithium ion-conducting as well as electron-conducting. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes and electrode active materials have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a material that has all or most of the properties desired for use as an anode active material in a lithium-ion battery. Thus, there is an urgent and continuing need for a new anode active material that enables a lithium-ion battery to exhibit a high cycle life, high reversible capacity, low irreversible capacity, small particle sizes (for high-rate capacity), and compatibility with commonly used electrolytes. There is also a need for a method of readily or easily producing such a material in large quantities.

Thus, it is a specific object of the present disclosure to meet these needs and address the issues associated the rapid capacity decay of a lithium battery containing a high-capacity anode active material.

SUMMARY OF THE INVENTION

Herein reported is an anode active material layer for a lithium battery that contains a very unique class of anode active materials: elastomer-encapsulated particles of an anode active material that is capable of overcoming the rapid capacity decay problem commonly associated with a lithium-ion battery that features a high-capacity anode active material, such as Si, $SiO_x$, Ge, Sn, $SnO_2$, $Mn_3O_4$, and $Co_3O_4$.

The anode active material layer comprises multiple particulates of an anode active material, wherein a particulate is composed of one or a plurality of particles of an anode active material being encapsulated by a thin layer of graphene/elastomer composite having from 0.01% to 50% by weight of graphene sheets dispersed in an elastomeric matrix material (based on the total weight of the graphene/elastomer composite), wherein the encapsulating thin layer of graphene/elastomer composite has a fully recoverable tensile strain from 2% to 500% (more typically from 5% to 300% and most typically from 10% to 150%), a thickness from 1 nm to 10 μm, a lithium ion conductivity from $10^{-7}$ S/cm to $10^{-2}$ S/cm (more typically from $10^{-5}$ S/cm to $10^{-3}$ S/cm) and an electrical conductivity from $10^{-7}$ S/cm to 100 S/cm (more typically from $10^{-3}$ S/cm to 10 S/cm) when measured at room temperature on a cast thin film 20 μm thick. The anode active material preferably contains a high-capacity anode active material that has a specific capacity of lithium storage greater than 372 mAh/g, which is the theoretical capacity of graphite.

Preferably, the elastomeric matrix material contains a material selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) (POE) elastomer, poly(ethylene-co-butene) (PBE) elastomer, styrene-ethylene-butadiene-styrene (SEBS) elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof. These elastomers or rubbers, when present without graphene sheets, exhibit a high elasticity (having a fully recoverable tensile strain from 2% to 1,000%). In other words, they can be stretched up to 1,000% (10 times of the original length when under tension) and, upon release of the tensile stress, they can fully recover back to the original dimension. By adding from 0.01% to 50% by weight of graphene sheets dispersed in an elastomeric matrix material, the fully recoverable tensile strains are typically reduced down to 2%-500% (more typically from 5% to 300% and most typically from 10% to 150%).

The graphene sheets to be dispersed in an elastomer matrix are preferably selected from pristine graphene, graphene oxide, reduced graphene oxide, graphene fluoride, graphene chloride, nitrogenated graphene, hydrogenated graphene, doped graphene, functionalized graphene, or a combination thereof.

The graphene sheets preferably comprise single-layer graphene or few-layer graphene, wherein the few-layer graphene is defined as a graphene platelet formed of less than 10 graphene planes.

Preferably, the graphene sheets have a lateral dimension (length or width) from 5 nm to 5 µm, more preferably from 10 nm to 1 µm, and most preferably from 10 nm to 300 nm. Shorter graphene sheets allow for easier encapsulation and enable faster lithium ion transport through the graphene/elastomer composite layer.

In this anode active material layer, the anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof.

In some preferred embodiments, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, or a combination thereof, wherein x=1 to 2.

It may be noted that prelithiation of an anode active material means that this material has been pre-intercalated by or doped with lithium ions up to a weight fraction from 0.1% to 54.7% of Li in the lithiated product.

The anode active material is preferably in a form of nanoparticle (spherical, ellipsoidal, and irregular shape), nanowire, nanofiber, nanotube, nanosheet, nanobelt, nanoribbon, nanodisc, nanoplatelet, or nanohorn having a thickness or diameter less than 100 nm. These shapes can be collectively referred to as "particles" unless otherwise specified or unless a specific type among the above species is desired. Further preferably, the anode active material has a dimension less than 50 nm, even more preferably less than 20 nm, and most preferably less than 10 nm.

In some embodiments, one particle or a cluster of multiple particles may be coated with or embraced by a layer of carbon disposed between the particle(s) and the graphene/elastomer composite layer (the encapsulating shell). Alternatively or additionally, a carbon layer may be deposited to embrace the encapsulated particle or the encapsulated cluster of multiple anode active material particles.

The particulate may further contain a graphite or carbon material mixed with the active material particles, which are all encapsulated by the encapsulating shell (but not dispersed within this thin layer). The carbon or graphite material is selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof.

The anode active material particles may be coated with or embraced by a conductive protective coating, selected from a carbon material, electronically conductive polymer, conductive metal oxide, or conductive metal coating. Preferably, the anode active material, in the form of a nanoparticle, nanowire, nanofiber, nanotube, nanosheet, nanobelt, nanoribbon, nanodisc, nanoplatelet, or nanohorn is pre-intercalated or pre-doped with lithium ions to form a prelithiated anode active material having an amount of lithium from 0.1% to 54.7% by weight of said prelithiated anode active material.

Preferably and typically, the graphene/elastomer composite has a lithium ion conductivity no less than $10^{-6}$ S/cm, more preferably no less than $5\times10^{-5}$ S/cm. In certain embodiments, the elastomeric matrix material further contains from 0.1% to 40% by weight (preferably from 1% to 30% by weight) of a lithium ion-conducting additive dispersed in the elastomer matrix material.

In some embodiments, the elastomeric matrix material contains a material selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), metallocene-based poly(ethylene-co-octene) (POE) elastomer, poly(ethylene-co-butene) (PBE) elastomer, styrene-ethylene-butadiene-styrene (SEBS) elastomer, epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some preferred embodiments, the elastomeric matrix material contains a lithium ion-conducting additive dispersed in an elastomer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0\leq x\leq1$, $1\leq y\leq4$.

In some embodiments, the elastomeric material further contains a lithium ion-conducting additive dispersed in an elastomer matrix material, wherein the lithium ion-conducting additive contains a lithium salt selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3$ ($CF_2CF_3$)$_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

The proportion of this additive is preferably from 0.1% to 40% by weight, but more preferably from 1% to 25% by weight. The sum of this additive and graphene sheets preferably occupies from 1% to 40% by weight, more preferably from 3% to 35% by weight, and most preferably from 5% to 25% by weight of the resulting composite weight (elastomer matrix, graphene, and additive combined).

The elastomeric matrix material may contain a mixture or blend of an elastomer and an electron-conducting polymer selected from polyaniline, polypyrrole, polythiophene, polyfuran, a bi-cyclic polymer, derivatives thereof (e.g. sulfonated versions of these electron-conducting polymers), or a combination thereof. The proportion of this electron-conducting polymer is preferably from 0.1% to 20% by weight.

In some embodiments, the elastomeric matrix material contains a mixture or blend of an elastomer and a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), Poly bis-methoxy ethoxyethoxide-phosphazenes, Polyvinyl chloride, Polydimethylsiloxane, poly(vinylidene fluoride)-hexafluoropropylene (PVDF-HFP), a sulfonated derivative thereof, or a combination thereof. Sulfonation is herein found to impart improved lithium ion conductivity to a polymer. The proportion of this lithium ion-conducting polymer is preferably from 0.1% to 20% by weight. Mixing or dispersion of an additive or reinforcement species in an elastomer or rubber may be conducted using solution mixing or melt mixing.

The present disclosure also provides a powder mass of an anode active material for a lithium battery. The powder mass comprises multiple particulates of an anode active material, wherein at least a particulate is composed of one or a plurality of particles of an anode active material being encapsulated by a thin layer of graphene/elastomer composite having from 0.01% to 50% by weight of graphene sheets dispersed in an elastomeric matrix material based on the total weight of the graphene/elastomer composite, wherein the encapsulating thin layer has a thickness from 1 nm to 10 µm and the graphene/elastomer composite has a lithium ion conductivity from $10^{-7}$ S/cm to $10^{-2}$ S/cm and an electrical conductivity from $10^{-7}$ S/cm to 100 S/cm when measured at room temperature. The anode active material preferably is selected from a high-capacity anode active material having a specific capacity of lithium storage greater than 372 mAh/g. The powder mass may further comprise, in addition to the graphene/elastomer composite-encapsulated particulates, some graphite particles, carbon particles, mesophase microbeads, carbon or graphite fibers, carbon nanotubes, graphene sheets, or a combination thereof. These additional graphite/carbon materials serve as a conductive additive and, if so desired, as a diluent to reduce the overall specific capacity of an anode electrode. Preferably, the high-capacity anode is prelithiated.

The present disclosure also provides an anode electrode that contains the presently disclosed graphene/elastomer composite-encapsulated high-capacity anode material particles, an optional conductive additive (e.g. expanded graphite flakes, carbon black, acetylene black, or carbon nanotube), an optional resin binder (typically required), and, optionally, some amount of the common anode active materials (e.g. particles of natural graphite, synthetic graphite, hard carbon, etc.).

The present disclosure also provides a lithium battery containing an optional anode current collector, the presently disclosed anode active material layer as described above, a cathode active material layer, an optional cathode current collector, an electrolyte in ionic contact with the anode active material layer and the cathode active material layer and an optional porous separator. The lithium battery may be a lithium-ion battery, lithium metal battery (containing lithium metal or lithium alloy as the main anode active material and containing no intercalation-based anode active material), lithium-sulfur battery, lithium-selenium battery, or lithium-air battery.

The disclosure also provides a method of producing a powder mass of an anode active material for a lithium battery, the method comprising: (a) mixing graphene sheets and an elastomer or its precursor in a liquid medium or solvent to form a suspension; (b) dispersing a plurality of particles of an anode active material in the suspension to form a slurry; and (c) dispensing the slurry and removing the solvent and/or polymerizing/curing the precursor to form the powder mass, wherein the powder mass comprises multiple particulates of the anode active material, wherein at least one of the particulates is composed of one or a plurality of the anode active material particles which are encapsulated by a thin layer of graphene/elastomer composite having from 0.01% to 50% by weight of graphene sheets dispersed in an elastomeric matrix material based on the total weight of the graphene/elastomer composite, and wherein the encapsulating thin layer has a thickness from 1 nm to 10 µm and the graphene/elastomer composite has a fully recoverable tensile strain from 2% to 500%, a lithium ion conductivity from $10^{-7}$ S/cm to $10^{-2}$ S/cm and an electrical conductivity from $10^{-7}$ S/cm to 100 S/cm when measured at room temperature.

Preferably, step of mixing the graphene sheets and elastomer or its precursor includes a procedure of chemically bonding said elastomer or its precursor to said graphene sheets.

In certain embodiments, the step of dispensing the slurry and removing the solvent and/or polymerizing/curing the precursor to form the powder mass includes operating a procedure selected from pan-coating, air-suspension coating, centrifugal extrusion, vibration-nozzle encapsulation, spray-drying, coacervation-phase separation, interfacial polycondensation and interfacial cross-linking, In-situ polymerization, matrix polymerization, or a combination thereof.

In this method, the step of mixing the graphene sheets and elastomer or its precursor may include dissolving or dispersing from 0.1% to 40% by weight of a lithium ion-conducting additive in said liquid medium or solvent. The lithium ion-conducting additive may be selected from $Li_2CO_3$, $Li_2O$, $Li_2C_2O_4$, LiOH, LiX, $ROCO_2Li$, HCOLi, ROLi, ($ROCO_2Li$)$_2$, ($CH_2OCO_2Li$)$_2$, $Li_2S$, $Li_xSO_y$, or a combination thereof, wherein X=F, Cl, I, or Br, R=a hydrocarbon group, $0 \leq x \leq 1$, $1 \leq y \leq 4$. Alternatively or additionally, the lithium ion-conducting additive contains a lithium salt selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

In certain embodiments, the slurry further contains an electron-conducting polymer selected from polyaniline, polypyrrole, polythiophene, polyfuran, a bi-cyclic polymer, a sulfonated derivative thereof, or a combination thereof. Alternatively or additionally, the slurry further contains a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazenes, polyvinyl chloride, polydimethylsiloxane, poly(vinylidene fluoride)-hexafluoropropylene (PVDF-HFP), a sulfonated derivative thereof, or a combination thereof.

The method may further comprise mixing multiple particulates of the aforementioned anode active material, a binder resin, and an optional conductive additive to form an anode active material layer, which is optionally coated on an anode current collector. The method may further comprise combining the anode active material layer, a cathode layer, an electrolyte, and an optional porous separator into a lithium battery cell.

The presently disclosed graphene/elastomer composite-encapsulated active material particles meet all of the criteria required of a lithium-ion battery anode material:

(a) The encapsulating material is of high strength and stiffness so that it can help to refrain the electrode active material particles, when lithiated, from expanding to an excessive extent.
(b) The protective graphene/elastomer composite shell, having both high elasticity and high strength, has a high fracture toughness and high resistance to crack formation to avoid disintegration during repeated cycling.
(c) The graphene/elastomer composite shell is relatively inert (inactive) with respect to the electrolyte.
(d) The graphene/elastomer composite shell does not provide any significant amount of defect sites that irreversibly trap lithium ions. To the contrary, the elastomeric composite prevents the repeated formation and breakage of SEI, which otherwise would continue to trap and consume lithium ions and electrolyte leading to continued capacity decay.
(e) Surprisingly, the graphene/elastomer composite shell material is both lithium ion-conducting and electron-conducting.

DESCRIPTION OF THE PREFERRED EMBODIMENTS

This disclosure is directed at the anode active material layer (negative electrode layer, not including the anode current collector) containing a high-capacity anode material for a lithium secondary battery, which is preferably a secondary battery based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present disclosure is not limited to any battery shape or configuration. For convenience, we will primarily use Si, Sn, and $SnO_2$ as illustrative examples of a high-capacity anode active material. This should not be construed as limiting the scope of the disclosure.

Figure 1A:
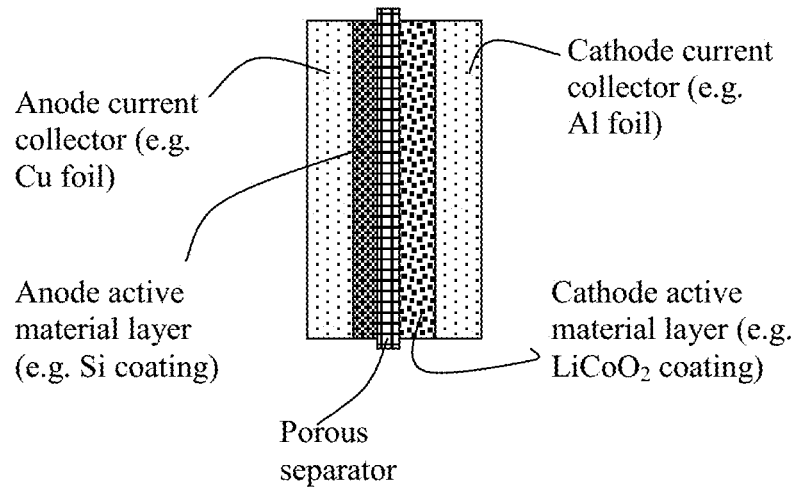
FIG. 1(A) Schematic of a prior art lithium-ion battery cell, wherein the anode layer is a thin coating of an anode active material itself.
Figure 1B:
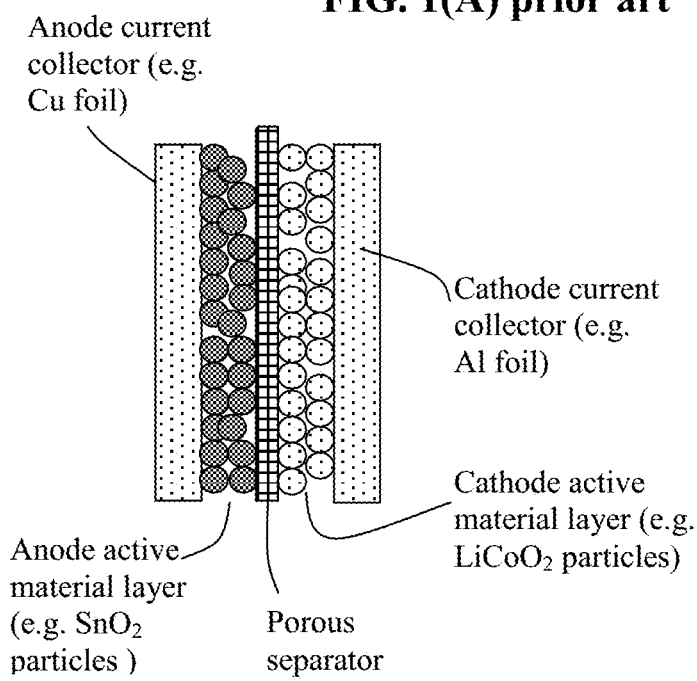
FIG. 1(B) Schematic of another prior art lithium-ion battery; the anode layer being composed of particles of an anode active material, a conductive additive (not shown) and a resin binder (not shown).

As illustrated in FIG. 1(B), a lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 μm thick (more typically 100-200 μm) to give rise to a sufficient amount of current per unit electrode area.

In a less commonly used cell configuration, as illustrated in FIG. 1(A), the anode active material is deposited in a thin film form directly onto an anode current collector, such as a sheet of copper foil. This is not commonly used in the battery industry and, hence, will not be discussed further.

Figure 2A:
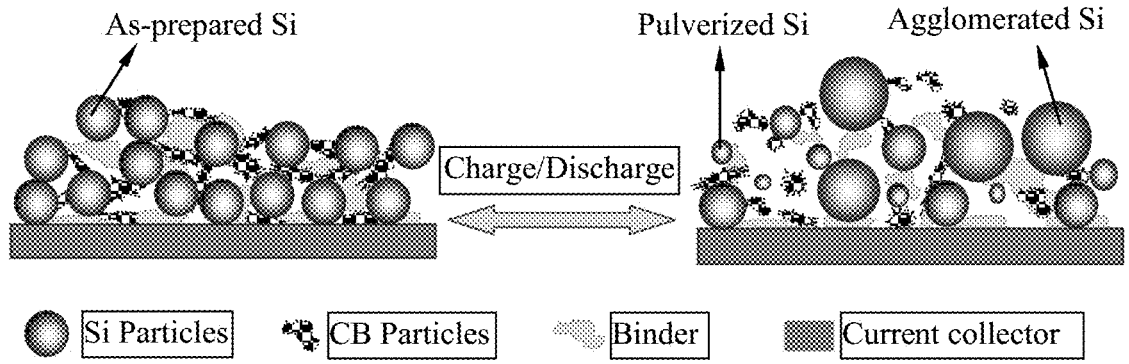
FIG. 2(A) Schematic illustrating the notion that expansion of Si particles, upon lithium intercalation during charging of a prior art lithium-ion battery, can lead to pulverization of Si particles, interruption of the conductive paths formed by the conductive additive, and loss of contact with the current collector.

In order to obtain a higher energy density cell, the anode in FIG. 1(B) can be designed to contain higher-capacity anode active materials having a composition formula of $Li_aA$ (A is a metal or semiconductor element, such as Al and Si, and "a" satisfies $0<a\leq5$). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as discussed in the Background section, there are several problems associated with the implementation of these high-capacity anode active materials:

1) As schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

2) The approach of using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles, has failed to overcome the capacity decay problem. Presumably, the protective matrix provides a cushioning effect for particle expansion or shrinkage, and prevents the electrolyte from contacting and reacting with the electrode active material. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

3) The approach of using a core-shell structure (e.g. Si nanoparticle encapsulated in a carbon or $SiO_2$ shell) also has not solved the capacity decay issue. As illustrated in upper portion of FIG. 2(B), a non-lithiated Si particle can be encapsulated by a carbon shell to form a core-shell structure (Si core and carbon or $SiO_2$ shell in this example). As the lithium-ion battery is charged, the anode active material (carbon- or $SiO_2$-encapsulated Si particle) is intercalated with lithium ions and, hence, the Si particle expands. Due to the brittleness of the encapsulating shell (carbon), the shell is broken into segments, exposing the underlying Si to electrolyte and subjecting the Si to undesirable reactions with electrolyte during repeated charges/discharges of the battery. These reactions continue to consume the electrolyte and reduce the cell's ability to store lithium ions.

Figure 2B:
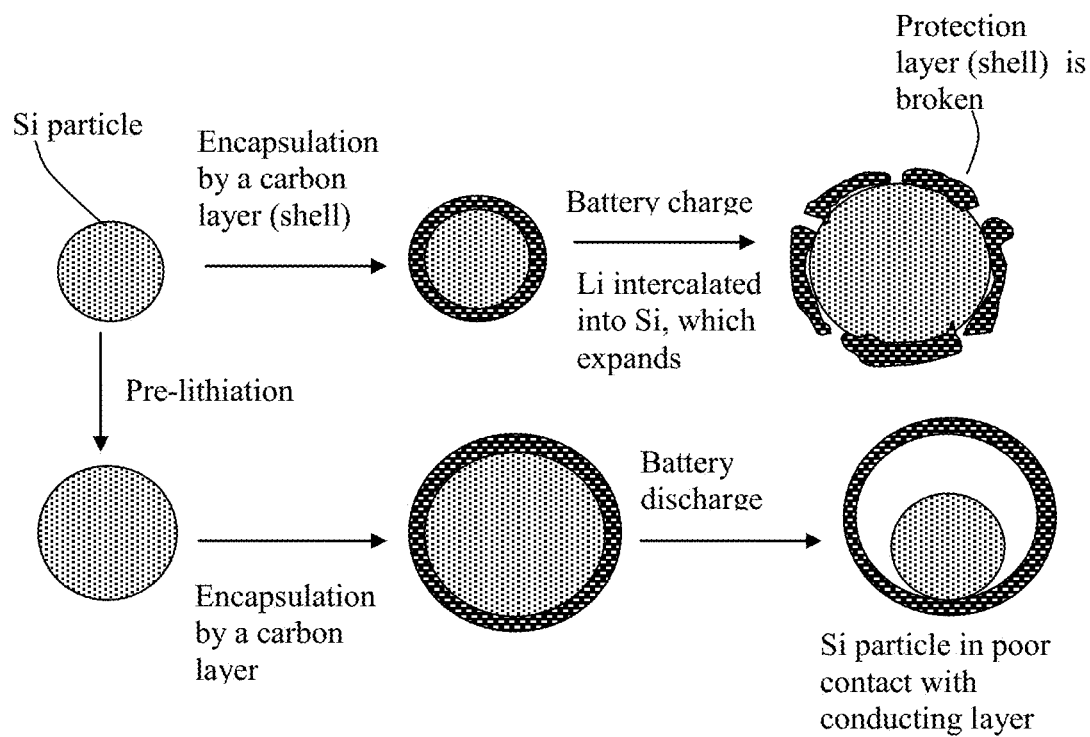
FIG. 2(B) illustrates the issues associated with prior art anode active material; for instance, a non-lithiated Si particle encapsulated by a protective shell (e.g. carbon shell) in a core-shell structure inevitably leads to breakage of the shell and that a prelithiated Si particle encapsulated with a protective layer leads to poor contact between the contracted Si particle and the rigid protective shell during battery discharge.

4) Referring to the lower portion of FIG. 2(B), wherein the Si particle has been prelithiated with lithium ions; i.e. has been pre-expanded in volume. When a layer of carbon (as an example of a protective material) is encapsulated around the prelithiated Si particle, another core-shell structure is formed. However, when the battery is discharged and lithium ions are released (de-intercalated) from the Si particle, the Si particle contracts, leaving behind a large gap between the protective shell and the Si particle. Such a configuration is not conducive to lithium intercalation of the Si particle during the subsequent battery charge cycle due to the gap and the poor contact of Si particle with the protective shell (through which lithium ions can diffuse). This would significantly curtail the lithium storage capacity of the Si particle particularly under high charge rate conditions.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these often conflicting problems. We have solved these challenging issues that have troubled battery designers and electrochemists alike for more than 30 years by developing the elastomer-protected anode active material.

The present disclosure provides an anode active material layer comprising multiple particulates of an anode active material, wherein at least a particulate is composed of one or a plurality of particles of an anode active material being encapsulated by a thin layer of graphene/elastomer composite that has thickness from 1 nm to 10 μm. Preferably, the graphene/elastomer composite has a fully recoverable tensile strain from 2% to 500% (more typically from 5% to 300% and most typically from 10% to 150%), a thickness from 1 nm to 10 μm, a lithium ion conductivity from $10^{-7}$ S/cm to $10^{-2}$ S/cm (more typically from $10^{-5}$ S/cm to $10^{-3}$ S/cm) and an electrical conductivity from $10^{-7}$ S/cm to 100 S/cm (more typically from $10^{-3}$ S/cm to 10 S/cm) when measured at room temperature on a separate cast thin film 20 μm thick. Preferably, the anode active material is a high-capacity anode active material having a specific lithium storage capacity greater than 372 mAh/g (which is the theoretical capacity of graphite).

Preferably, graphene sheets include pristine graphene, graphene oxide, reduced graphene oxide, graphene fluoride, graphene chloride, nitrogenated graphene, hydrogenated graphene, doped graphene, or functionalized graphene. Further preferably, graphene sheets include single-layer graphene or few layer graphene (having 2-10 graphene planes). More preferably, the graphene sheets contain 1-5 graphene planes, most preferably 1-3 graphene planes (i.e. single-layer, double-layer, or triple-layer graphene).

Figure 4:
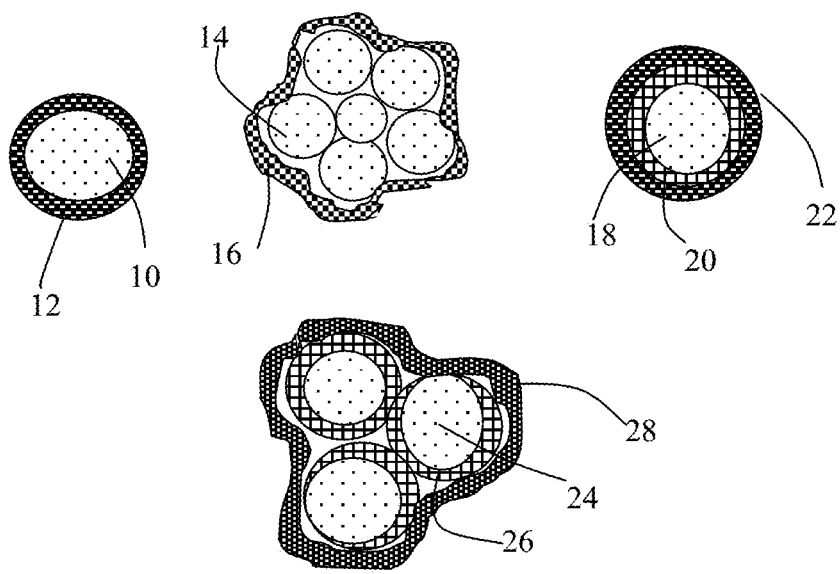
FIG. 4 Schematic of four types of graphene/elastomer composite-embraced anode active material particles.

As illustrated in FIG. 4, the present disclosure provides four major types of particulates of graphene/elastomer composite-encapsulated anode active material particles. The first one is a single-particle particulate containing an anode active material core 10 encapsulated by an elastomer shell 12. The second is a multiple-particle particulate containing multiple anode active material particles 14 (e.g. Si nanoparticles), optionally along with other active materials (e.g. particles of graphite or hard carbon, not shown) or conductive additive, which are encapsulated by a graphene/elastomer composite shell 16. The third is a single-particle particulate containing an anode active material core 18 coated by a carbon layer 20 (or other conductive material) further encapsulated by a graphene/elastomer composite shell 22. The fourth is a multiple-particle particulate containing multiple anode active material particles 24 (e.g. Si nanoparticles) coated with a conductive protection layer 26, optionally along with other active materials (e.g. particles of graphite or hard carbon, not shown) or conductive additive, which are encapsulated by a graphene/elastomer shell 28. These anode active material particles can be prelithiated or non-prelithiated.

Figure 3:
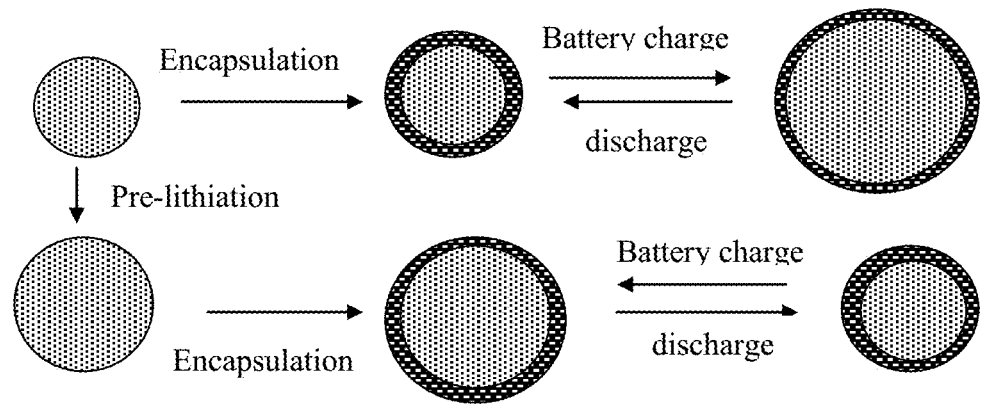
FIG. 3 Schematic of the presently disclosed graphene/elastomer composite-encapsulated anode active material particles (prelithiated or unlithiated). The elasticity of the elastomeric shell enables the shell to expand and contract congruently and conformingly with core particle.

As schematically illustrated in the upper portion of FIG. 3, a non-lithiated Si particle can be encapsulated by an elastomeric composite shell to form a core-shell structure (Si core and elastomer shell in this example). As the lithium-ion battery is charged, the anode active material (elastomer-encapsulated Si particle) is intercalated with lithium ions and, hence, the Si particle expands. Due to the high elasticity of the encapsulating shell (graphene/elastomer composite), the shell will not be broken into segments (in contrast to the broken carbon shell). That the elastomeric composite shell remains intact prevents the exposure of the underlying Si to electrolyte and, thus, prevents the Si from undergoing undesirable reactions with electrolyte during repeated charges/discharges of the battery. This strategy prevents continued consumption of the electrolyte to repeatedly form additional SEI.

Alternatively, referring to the lower portion of FIG. 3, wherein the Si particle has been prelithiated with lithium ions; i.e. has been pre-expanded in volume. When a layer of graphene/elastomer composite is made to encapsulate around the prelithiated Si particle, another core-shell structure is formed. When the battery is discharged and lithium ions are released (de-intercalated) from the Si particle, the Si particle contracts. However, the graphene/elastomer composite is capable of elastically shrinking in a conformal manner; hence, leaving behind no gap between the protective shell and the Si particle. Such a configuration is more amenable to subsequent lithium intercalation and de-intercalation of the Si particle. The elastomeric shell expands and shrinks congruently with the expansion and shrinkage of the encapsulated core anode active material particle, enabling long-term cycling stability of a lithium battery featuring a high-capacity anode active material (such as Si, Sn, $SnO_2$, $Co_3O_4$, etc.).

The anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li; and (h) combinations thereof. Particles of Li or Li alloy (Li alloy containing from 0.1% to 10% by weight of Zn, Ag, Au, Mg, Ni, Ti, Fe, Co, or V element), particularly surface-stabilized Li particles (e.g. wax-coated Li particles), were found to be good anode active material per se or an extra lithium source to compensate for the loss of Li ions that are otherwise supplied only from the cathode active material. The presence of these Li or Li-alloy particles encapsulated inside an elastomeric shell was found to significantly improve the cycling performance of a lithium cell.

Prelithiation of an anode active material can be conducted by several methods (chemical intercalation, ion implementation, and electrochemical intercalation). Among these, the electrochemical intercalation is the most effective. Lithium ions can be intercalated into non-Li elements (e.g. Si, Ge, and Sn) and compounds (e.g. $SnO_2$ and $Co_3O_4$) up to a weight percentage of 54.68% (see Table 1 below). For Zn, Mg, Ag, and Au encapsulated inside an elastomer shell, the amount of Li can reach 99% by weight.

TABLE 1

Lithium storage capacity of selected non-Li elements.

| Intercalated compound | Atomic weight of Li, g/mole | Atomic weight of active material, g/mole | Max. wt. % of Li |
|---|---|---|---|
| $Li_4Si$ | 6.941 | 28.086 | 49.71 |
| $Li_{4.4}Si$ | 6.941 | 28.086 | 54.68 |
| $Li_{4.4}Ge$ | 6.941 | 72.61 | 30.43 |
| $Li_{4.4}Sn$ | 6.941 | 118.71 | 20.85 |
| $Li_3Cd$ | 6.941 | 112.411 | 14.86 |
| $Li_3Sb$ | 6.941 | 121.76 | 13.93 |
| $Li_{4.4}Pb$ | 6.941 | 207.2 | 13.00 |
| LiZn | 6.941 | 65.39 | 7.45 |
| $Li_3Bi$ | 6.941 | 208.98 | 8.80 |

The particles of the anode active material may be in the form of a nanoparticle, nanowire, nanofiber, nanotube, nanosheet, nanoplatelet, nanodisc, nanobelt, nanoribbon, or nanohorn. They can be non-lithiated (when incorporated into the anode active material layer) or prelithiated to a desired extent (up to the maximum capacity as allowed for a specific element or compound.

Preferably and typically, the graphene/elastomer composite has a lithium ion conductivity no less than $10^{-7}$ S/cm, more preferably no less than $10^{-5}$ S/cm, further more preferably no less than $10^{-4}$ S/cm, and most preferably no less than $10^{-3}$ S/cm. In some embodiments, the composite further contains from 0.1% to 40% (preferably 1% to 35%) by weight of a lithium ion-conducting additive dispersed in an elastomer matrix material.

The graphene/elastomer composite must have a high elasticity (high elastic deformation value). By definition, an elastic deformation is a deformation that is fully recoverable upon release of the mechanical stress and the recovery process is essentially instantaneous (no significant time delay). An elastomer, such as a vulcanized natural rubber, can exhibit an elastic deformation from 2% up to 1,000% (10 times of its original length). With the addition of 0.01%-50% of graphene sheets, the tensile elastic deformation is reduced to typically from 2% to 500%. It may be noted that although a metal typically has a high ductility (i.e. can be extended to a large extent without breakage), the majority of the deformation is plastic deformation (non-recoverable) and elastic deformation occurs to only a small extent (typically <1% and more typically <0.2%).

A broad array of graphene/elastomer composites can be used to encapsulate an anode active material particle or multiple particles. Encapsulation means substantially fully embracing the particle(s) without allowing the particle to be in direct contact with electrolyte in the battery. The elastomeric matrix material may be selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR)), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), metallocene-based poly (ethylene-co-octene) (POE) elastomer, poly(ethylene-cobutene) (PBE) elastomer, styrene-ethylene-butadiene-styrene (SEBS) elastomer, epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxideepichlorohydrin copolymer, polyurethane, urethane-urea copolymer, and combinations thereof.

The urethane-urea copolymer film usually consists of two types of domains, soft domains and hard ones. Entangled linear backbone chains consisting of poly(tetramethylene ether) glycol (PTMEG) units constitute the soft domains, while repeated methylene diphenyl diisocyanate (MDI) and ethylene diamine (EDA) units constitute the hard domains. The lithium ion-conducting additive can be incorporated in the soft domains or other more amorphous zones.

A nanographene platelet (NGP) or graphene sheet is composed of one basal plane (graphene plane) or multiple basal planes stacked together in the thickness direction. In a graphene plane, carbon atoms occupy a 2-D hexagonal lattice in which carbon atoms are bonded together through strong in-plane covalent bonds. In the c-axis or thickness direction, these graphene planes may be weakly bonded together through van der Waals forces. An NGP can have a platelet thickness from less than 0.34 nm (single layer) to 100 nm (multi-layer). For the present electrode use, the preferred thickness is <10 nm, more preferably <3 nm (or <10 layers), and most preferably single-layer graphene. Thus, the presently disclosed graphene/elastomer composite shell preferably contains mostly single-layer graphene, but could make use of some few-layer graphene (less than 10 layers or 10 graphene planes). The graphene sheet may contain a small amount (typically <25% by weight) of non-carbon elements, such as hydrogen, nitrogen, fluorine, and oxygen, which are attached to an edge or surface of the graphene plane.

Graphene sheets may be oxidized to various extents during their preparation, resulting in graphite oxide (GO) or graphene oxide. Hence, in the present context, graphene preferably or primarily refers to those graphene sheets containing no or low oxygen content; but, they can include GO of various oxygen contents. Further, graphene may be fluorinated to a controlled extent to obtain graphite fluoride, or can be doped using various dopants, such as boron and nitrogen.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days). In order to reduce the time required to produce a precursor solution or suspension, one may choose to oxidize the graphite to some extent for a shorter period of time (e.g., 30 minutes) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. The un-broken graphite worms or individual graphite flakes are then re-dispersed in water, acid, or organic solvent and ultrasonicated to obtain a graphene polymer solution or suspension.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nanoscaled platelets, which are pristine, non-oxidized NGPs.

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The laminar graphite materials used in the prior art processes for the production of the GIC, graphite oxide, and subsequently made exfoliated graphite, flexible graphite sheets, and graphene platelets are, in most cases, natural graphite. However, the present disclosure is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nanofiber, carbon nanotube, mesophase carbon microbead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

Graphene sheets may be oxidized to various extents during their preparation, resulting in graphite oxide or graphene oxide (GO). Hence, in the present context, graphene preferably or primarily refers to those graphene sheets containing no or low oxygen content; but, they can include GO of various oxygen contents. Further, graphene may be fluorinated to a controlled extent to obtain graphene fluoride.

Pristine graphene may be produced by direct ultrasonication (also known as liquid phase production) or supercritical fluid exfoliation of graphite particles. These processes are well-known in the art. Multiple pristine graphene sheets may be dispersed in water or other liquid medium with the assistance of a surfactant to form a suspension.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

In some embodiments, the elastomeric composite further contains a lithium ion-conducting additive dispersed in an elastomer matrix material, wherein the lithium ion-conducting additive is selected from $Li_2CO_3$, $Li_2O$, $Li_2C_2O_4$, LiOH, LiX, $ROCO_2Li$, $HCOLi$, $ROLi$, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0 \leq x \leq 1$, $1 \leq y \leq 4$.

Alternatively, the lithium ion-conducting additive may contain a lithium salt selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato) borate, LiBOB, lithium oxalyldifluoroborate, $LiBF_2C_2O_4$, lithium oxalyldifluoroborate, $LiBF_2C_2O_4$, lithium nitrate, $LiNO_3$, Li-fluoroalkyl-phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

The elastomeric matrix material may contain a mixture or blend of an elastomer and an electron-conducting polymer selected from polyaniline, polypyrrole, polythiophene, polyfuran, a bi-cyclic polymer, derivatives thereof (e.g. sulfonated versions), or a combination thereof.

In some embodiments, the elastomeric matrix material contains a mixture or blend of an elastomer and a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazenes, Polyvinyl chloride, polydimethylsiloxane, poly(vinylidene fluoride)-hexafluoropropylene (PVDF-HFP), a derivative thereof (e.g. sulfonated versions), or a combination thereof.

Some elastomers are originally in an unsaturated chemical state (unsaturated rubbers) that can be cured by sulfur vulcanization to form a cross-linked polymer that is highly elastic (hence, an elastomer). Prior to vulcanization, these polymers or oligomers are soluble in an organic solvent to form a polymer solution. Graphene sheets can be chemically functionalized to contain functional groups (e.g. —OH, —COOH, $NH_2$, etc.) that can react with the polymer or its oligomer.

The graphene-bonded oligomer or polymer may then be dispersed in a liquid medium (e.g. a solvent) to form a solution or suspension. Particles of an anode active material (e.g. $SnO_2$ nanoparticles and Si nanowires) can be dispersed in this polymer solution or suspension to form a slurry of an active material particle-polymer mixture. This suspension can then be subjected to a solvent removal treatment while individual particles remain substantially separated from one another. The graphene-bonded polymer precipitates out to deposit on surfaces of these active material particles. This can be accomplished, for instance, via spray drying.

Unsaturated rubbers that can be vulcanized to become elastomer include natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), Some elastomers are saturated rubbers that cannot be cured by sulfur vulcanization; they are made into a rubbery or elastomeric material via different means: e.g. by having a copolymer domain that holds other linear chains together. Graphene sheets can be solution- or melt-dispersed into the elastomer to form a graphene/elastomer composite. Each of these graphene/elastomer composites can be used to encapsulate particles of an anode active material by one of several means: melt mixing (followed by pelletizing and ball-milling, for instance), solution mixing (dissolving the anode active material particles in an uncured polymer, monomer, or oligomer, with or without an organic solvent) followed by drying (e.g. spray drying), interfacial polymerization, or in situ polymerization of elastomer in the presence of anode active material particles.

Saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), poly-acrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chem-raz, Perlast), polyether block amides (PEBA), chloro-sulfonated polyethylene (CSM; e.g. Hypalon), and ethylene-vinyl acetate (EVA), thermoplastic elastomers (TPE), protein resilin, and protein elastin. Polyurethane and its copolymers (e.g. urea-urethane copolymer) are particularly useful elastomeric shell materials for encapsulating anode active material particles.

Several micro-encapsulation processes require the elastomer materials to be dissolvable in a solvent. Fortunately, all the elastomers used herein are soluble in some common solvents. Even for those rubbers that are not very soluble after vulcanization, the un-cured polymer (prior to vulcanization or curing) can be readily dissolved in a common organic solvent to form a solution. This solution can then be used to encapsulate solid particles via several of the micro-encapsulation methods to be discussed in what follows. Upon encapsulation, the elastomer shell is then vulcanized or cured. Some examples of rubbers and their solvents are polybutadiene (2-methyl pentane+n-hexane or 2,3-dimeth-ylbutane), styrene-butadiene rubber (toluene, benzene, etc.), butyl rubber (n-hexane, toluene, cyclohexane), etc. The SBR can be vulcanized with different amounts sulfur and accelerator at 433° K in order to obtain different network structures and crosslink densities. Butyl rubber (IIR) is a copolymer of isobutylene and a small amount of isoprene (e.g. about 98% polyisobutylene with 2% isoprene distributed randomly in the polymer chain). Elemental sulfur and organic accelerators (such as thiuram or thiocarbamates) can be used to cross-link butyl rubber to different extents as desired. Thermoplastic elastomers are also readily soluble in solvents.

There are three broad categories of micro-encapsulation methods that can be implemented to produce elastomer-encapsulated particles of an anode active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-coating method: The pan coating process involves tumbling the active material particles in a pan or a similar device while the encapsulating material (e.g. elastomer monomer/oligomer, elastomer melt, elastomer/solvent solution) is applied slowly until a desired encapsulating shell thickness is attained.

Air-suspension coating method: In the air suspension coating process, the solid particles (core material) are dispersed into the supporting air stream in an encapsulating chamber. A controlled stream of a polymer-solvent solution (elastomer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with polymers while the volatile solvent is removed, leaving a very thin layer of polymer (elastomer or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Anode active materials may be encapsulated using a rotating extrusion head containing concentric nozzles. In this process, a stream of core fluid (slurry containing particles of an anode active material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle encapsulation method: Core-shell encapsulation or matrix-encapsulation of an anode active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material. The solidification can be done according to the used gelation system with an internal gelation (e.g. sol-gel processing, melt) or an external (additional binder system, e.g. in a slurry).

Spray-drying: Spray drying may be used to encapsulate particles of an active material when the active material is dissolved or suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material.

Coacervation-phase separation: This process consists of three steps carried out under continuous agitation:
(a) Formation of three immiscible chemical phases: liquid manufacturing vehicle phase, core material phase and encapsulation material phase. The core material is dispersed in a solution of the encapsulating polymer (elastomer or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.
(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and
(c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the anode active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form an elastomer shell material.

In-situ polymerization: In some micro-encapsulation processes, active materials particles are fully coated with a monomer or oligomer first. Then, direct polymerization of the monomer or oligomer is carried out on the surfaces of these material particles.

Matrix polymerization: This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

Example 1: Graphene Oxide from Sulfuric Acid Intercalation and Exfoliation of MCMBs MCMB (mesocarbon microbeads) were supplied by China Steel Chemical Co. This material has a density of about 2.24 g/cm$^3$ with a median particle size of about 16 μm. MCMBs (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C.-1,100° C. for 30-90 seconds to obtain graphene samples. A small quantity of graphene was mixed with water and ultrasonicated at 60-W power for 10 minutes to obtain a suspension. A small amount was sampled out, dried, and investigated with TEM, which indicated that most of the NGPs were between 1 and 10 layers. The oxygen content of the graphene powders (GO or RGO) produced was from 0.1% to approximately 25%, depending upon the exfoliation temperature and time.

Example 2: Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 4. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes to obtain a homogeneous graphene-water suspension.

Example 3: Preparation of Pristine Graphene Sheets

Pristine graphene sheets were produced by using the direct ultrasonication or liquid-phase exfoliation process. In a typical procedure, five grams of graphite flakes, ground to approximately 20 μm in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets were pristine graphene that had never been oxidized and were oxygen-free and relatively defect-free. There are substantially no other non-carbon elements.

Example 4: Preparation of Graphene Fluoride (GF) Sheets

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). A pre-cooled Teflon reactor was filled with 20-30 mL of liquid pre-cooled $ClF_3$, and then the reactor was closed and cooled to liquid nitrogen temperature. Subsequently, no more than 1 g of HEG was put in a container with holes for $ClF_3$ gas to access the reactor. After 7-10 days, a gray-beige product with approximate formula $C_2F$ was formed. GF sheets were then dispersed in halogenated solvents to form suspensions.

Example 5: Preparation of Nitrogenated Graphene Sheets

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenated graphene sheets remain dispersible in water.

Example 6: Cobalt Oxide ($Co_3O_4$) Anode Particulates

An appropriate amount of inorganic salts $Co(NO_3)_2 \cdot 6H_2O$ and ammonia solution ($NH_3 \cdot H_2O$, 25 wt. %) were mixed together. The resulting suspension was stirred for several hours under an argon flow to ensure a complete reaction. The obtained $Co(OH)_2$ precursor suspension was calcined at 450° C. in air for 2 h to form particles of the layered $Co_3O_4$. Portion of the $Co_3O_4$ particles was then encapsulated with a urea-urethane copolymer with the encapsulating elastomer shell thickness being varied from 17 nm to 135 nm.

For electrochemical testing, the working electrodes were prepared by mixing 85 wt. % active material (elastomer composite encapsulated or non-encapsulated particulates of $Co_3O_4$, separately), 7 wt. % acetylene black (Super-P), and 8 wt. % polyvinylidene fluoride (PVDF) binder dissolved in N-methyl-2-pyrrolidinoe (NMP) to form a slurry of 5 wt. % total solid content. After coating the slurries on Cu foil, the electrodes were dried at 120° C. in vacuum for 2 h to remove the solvent before pressing. Then, the electrodes were cut into a disk ($\phi$=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s.

The electrochemical performance of the particulates of elastomer composite-encapsulated $Co_3O_4$ particles and that of non-protected $Co_3O_4$ were evaluated by galvanostatic charge/discharge cycling at a current density of 50 mA/g, using a LAND electrochemical workstation. The results indicate that the charge/discharge profiles for the encapsulated $Co_3O_4$ particles and un-protected $Co_3O_4$ particle-based electrodes show a long voltage plateau at about 1.06 V and 1.10 V, respectively, followed by a slopping curve down to the cut-off voltage of 0.01 V, indicative of typical characteristics of voltage trends for the $Co_3O_4$ electrode.

Figure 5:
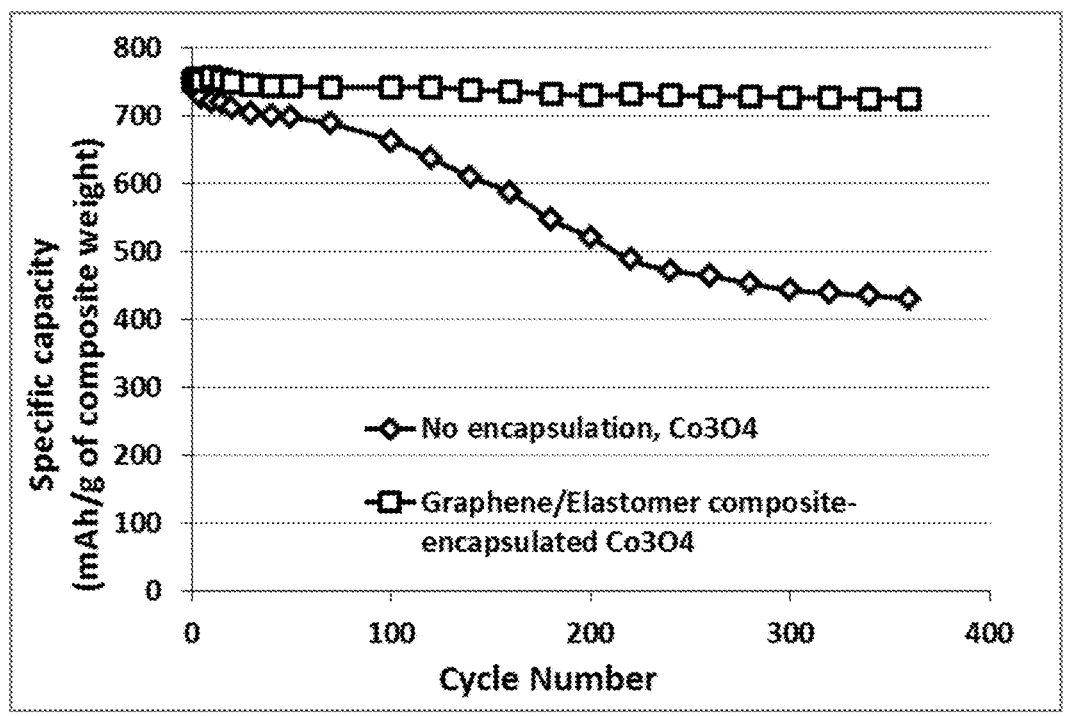
FIG. 5 The specific capacity of a lithium battery having an anode active material featuring graphene/elastomer composite-encapsulated $Co_3O_4$ particles and that having un-protected $Co_3O_4$ particles.

As summarized in FIG. 5, the first-cycle lithium insertion capacity is 752 mAh/g (non-encapsulated) and 751 mAh/g (encapsulated), respectively, which are higher than the theoretical values of graphite (372 mAh/g). Both cells exhibit some first-cycle irreversibility. The initial capacity loss might have resulted from the incomplete conversion reaction and partially irreversible lithium loss due to the formation of solid electrolyte interface (SEI) layers.

As the number of cycles increases, the specific capacity of the bare $Co_3O_4$ electrode drops precipitously. Compared with its initial capacity value of approximately 752 mAh/g, its capacity suffers a 20% loss after 150 cycles and a 42.7% loss after 360 cycles. By contrast, the presently disclosed elastomer-encapsulated particulates provide the battery cell with a very stable and high specific capacity for a large number of cycles, experiencing a capacity loss of less than 3.5% after 360 cycles. These data have clearly demonstrated the surprising and superior performance of the presently disclosed particulate electrode materials compared with prior art un-encapsulated particulate-based electrode materials.

It may be noted that the number of charge-discharge cycles at which the specific capacity decays to 80% of its initial value is commonly defined as the useful cycle life of a lithium-ion battery. Thus, the cycle life of the cell containing the non-encapsulated anode active material is approximately 150 cycles. In contrast, the cycle life of the presently disclosed cells (not just button cells, but large-scale full cells) is typically from 1,000 to 4,000.

Example 7: Elastomer-Encapsulated Tin Oxide Particulates

Tin oxide ($SnO_2$) nanoparticles were obtained by the controlled hydrolysis of $SnCl_4 \cdot 5H_2O$ with NaOH using the following procedure: $SnCl_4 \cdot 5H_2O$ (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 m in. Subsequently, the resulting hydrosol was reacted with $H_2SO_4$. To this mixed solution, few drops of 0.1 M of $H_2SO_4$ were added to flocculate the product. The precipitated solid was collected by centrifugation, washed with water and ethanol, and dried in vacuum. The dried product was heat-treated at 400° C. for 2 h under Ar atmosphere. A dilute elastomer-solvent solution (0.01-0.1 M of cis-polyisoprene in cyclohexane and 1,4-dioxane) was used as a coating solution in an air-suspension method to produce elastomer-encapsulated $SnO_2$ particles having a shell thickness of 2.3 nm to 124 nm.

Figure 6:
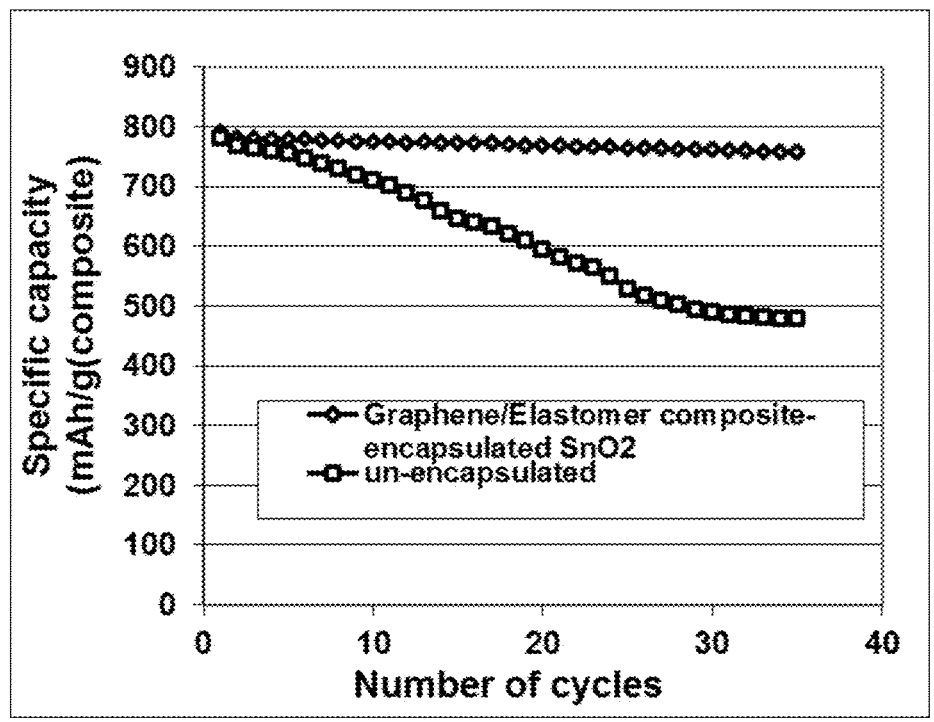
FIG. 6 The specific capacity of a lithium battery having an anode active material featuring graphene/elastomer composite-encapsulated $SnO_2$ particles and that having un-protected $SnO_2$ particles.

The battery cells from the elastomer-encapsulated particulates (nanoscaled $SnO_2$ particles) and non-coated $SnO_2$ particles were prepared using a procedure described in Example 1. FIG. 6 shows that the anode prepared according to the presently disclosed graphene/elastomer composite-encapsulated particulate approach offers a significantly more stable and higher reversible capacity compared to the un-coated $SnO_2$ particle-based.

Example 8: Tin (Sn) Nanoparticles Encapsulated by a Styrene-Butadiene Rubber (SBR)

Nanoparticles (76 nm in diameter) of Sn were encapsulated with a thin layer of SBR shell via the spray-drying method, followed by curing of the butadiene segment of the SBR chains to impart high elasticity to the SBR. For comparison, some amount of Sn nanoparticles was encapsulated by a carbon shell. Carbon encapsulation is well-known in the art. Un-protected Sn nanoparticles from the same batch were also investigated to determine and compare the cycling behaviors of the lithium-ion batteries containing these particles as the anode active material.

Figure 7:
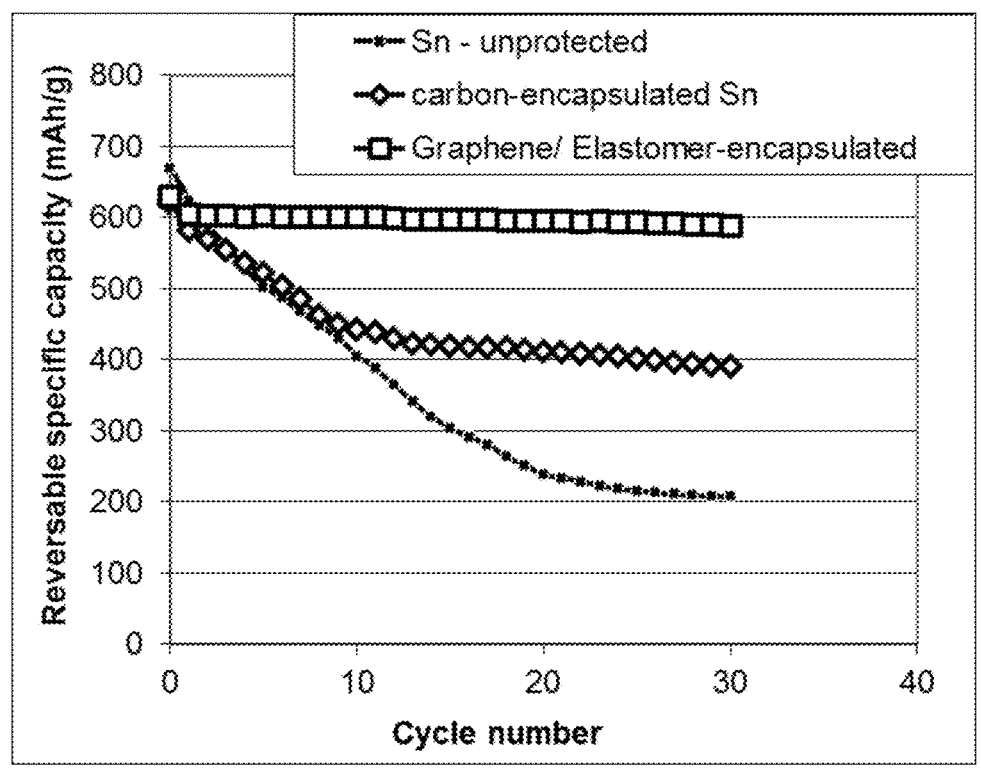
FIG. 7 The specific capacity of a lithium battery having an anode active material featuring graphene/elastomer composite-encapsulated Sn particles, that having carbon-encapsulated Sn particles, and that having un-protected Sn particles.

Shown in FIG. 7 are the discharge capacity curves of three coin cells having three different Sn particles as the anode active material: graphene/elastomer composite-encapsulated Sn particles, carbon-encapsulated Sn particles, and un-protected Sn particles. These results have clearly demonstrated that graphene/elastomer composite encapsulation strategy provides the very best protection against capacity decay of a lithium-ion battery featuring a high-capacity anode active material. Carbon encapsulation is not good enough to provide the necessary protection.

Example 9: Si Nanowire-Based Particulates

Figure 8:
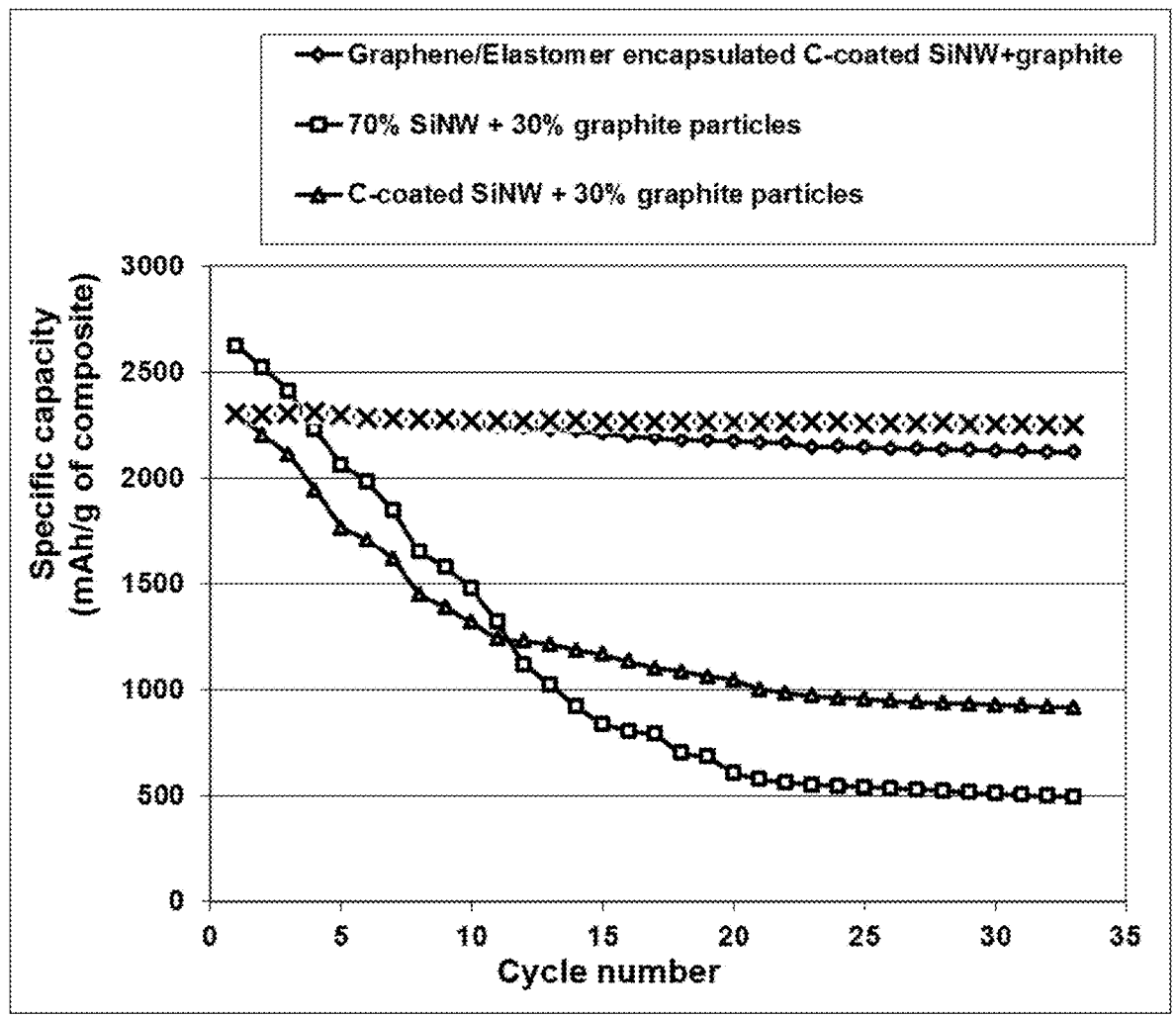
FIG. 8 Specific capacities of 4 lithium-ion cells having Si nanowires (SiNW) as an anode active material: unprotected SiNW, carbon-coated SiNW, graphene/elastomer composite-encapsulated SiNW, and graphene/elastomer composite-encapsulated carbon-coated SiNW.

Si nanowires were supplied from Angstron Energy Co. (Dayton, Ohio). Some Si nanowires were encapsulated with graphene-reinforced cis-polyisoprene elastomer. Some Si nanowires were coated with a layer of amorphous carbon and then encapsulated with graphene-reinforced cis-polyisoprene elastomer. For comparison purposes, Si nanowires unprotected and protected by carbon coating (but no elastomer encapsulation), respectively, were also prepared and implemented in a separate lithium-ion cell. In all four cells, approximately 25-30% of graphite particles were mixed with the protected or unprotected Si nanowires (SiNW), along with 5% binder resin, to make an anode electrode. The cycling behaviors of these 4 cells are shown in FIG. 8, which indicates that graphene/elastomer composite encapsulation of Si nanowires, with or without carbon coating, provides the most stable cycling response. Carbon coating alone does not help to improve cycling stability by much.

Example 10: Effect of Lithium Ion-Conducting Additive in an Elastomer Shell

A wide variety of lithium ion-conducting additives were added to several different graphene/elastomer composites to prepare encapsulation shell materials for protecting core particles of an anode active material. We have discovered that these elastomer composite materials are suitable encapsulation shell materials provided that their lithium ion conductivity at room temperature is no less than $10^{-7}$ S/cm. With these materials, lithium ions appear to be capable of readily diffusing in and out of the encapsulation shell having a thickness no greater than 1 μm. For thicker shells (e.g. 10 μm), a lithium ion conductivity at room temperature no less than $10^{-4}$ S/cm would be required.

TABLE 2

Lithium ion conductivity of various elastomer composite compositions as a shell material for protecting anode active material particles.

| Sample No. | Lithium-conducting additive | Graphene-elastomer (1-2 μm thick); 5% graphene unless otherwise noted | Li-ion conductivity (S/cm) |
| --- | --- | --- | --- |
| E-1 | $Li_2CO_3$ + $(CH_2OCO_2Li)_2$ | 70-99% polyurethane, 2% RGO | $2.3 \times 10^{-6}$ to $1.2 \times 10^{-3}$ S/cm |
| E-2 | $Li_2CO_3$ + $(CH_2OCO_2Li)_2$ | 65-99% polyisoprene, 8% pristine graphene | $5.1 \times 10^{-6}$ to $3.7 \times 10^{-4}$ S/cm |
| E-3 | $Li_2CO_3$ + $(CH_2OCO_2Li)_2$ | 65-80% SBR, 15% RGO | $6.2 \times 10^{-6}$ to $5.4 \times 10^{-4}$ S/cm |
| D-4 | $Li_2CO_3$ + $(CH_2OCO_2Li)_2$ | 70-99% urethane-urea, 12% nitrogenated graphene | $7.1 \times 10^{-7}$ to $3.3 \times 10^{-4}$ S/cm |
| D-5 | $Li_2CO_3$ + $(CH_2OCO_2Li)_2$ | 75-99% polybutadiene | $6.2 \times 10^{-6}$ to $3.2 \times 10^{-3}$ S/cm |
| B1 | LiF + LiOH + $Li_2C_2O_4$ | 80-99% chloroprene rubber | $6.7 \times 10^{-7}$ to $2.4 \times 10^{-4}$ S/cm |
| B2 | LiF + HCOLi | 80-99% EPDM | $2.3 \times 10^{-6}$ to $1.6 \times 10^{-3}$ S/cm |
| B3 | LiOH | 70-99% polyurethane | $2.4 \times 10^{-5}$ to $1.1 \times 10^{-3}$ S/cm |
| B4 | $Li_2CO_3$ | 70-99% polyurethane | $4.2 \times 10^{-5}$ to $4.2 \times 10^{-3}$ S/cm |
| B5 | $Li_2C_2O_4$ | 70-99% polyurethane | $8.3 \times 10^{-6}$ to $7.8 \times 10^{-4}$ S/cm |
| B6 | $Li_2CO_3$ + LiOH | 70-99% polyurethane | $1.6 \times 10^{-5}$ to $1.8 \times 10^{-3}$ S/cm |
| C1 | $LiClO_4$ | 70-99% urethane-urea | $4.3 \times 10^{-5}$ to $2.5 \times 10^{-3}$ S/cm |
| C2 | $LiPF_6$ | 70-99% urethane-urea | $2.2 \times 10^{-5}$ to $8.9 \times 10^{-4}$ S/cm |
| C3 | $LiBF_4$ | 70-99% urethane-urea | $1.8 \times 10^{-5}$ to $1.7 \times 10^{-4}$ S/cm |
| C4 | LiBOB + $LiNO_3$ | 70-99% urethane-urea | $6.3 \times 10^{-6}$ to $1.4 \times 10^{-4}$ S/cm |
| S1 | Sulfonated polyaniline | 85-99% SBR | $6.3 \times 10^{-6}$ to $4.5 \times 10^{-4}$ S/cm |
| S2 | Sulfonated SBR | 85-99% SBR | $5.5 \times 10^{-6}$ to $2.3 \times 10^{-4}$ S/cm |
| S3 | Sulfonated PVDF | 80-99% chlorosulfonated polyethylene (CS-PE) | $3.4 \times 10^{-6}$ to $3.7 \times 10^{-4}$ S/cm |
| S4 | Polyethylene oxide | 80-99% CS-PE | $4.7 \times 10^{-6}$ to $3.8 \times 10^{-4}$ S/cm |

Example 11: Cycle Stability of Various Rechargeable Lithium Battery Cells

In lithium-ion battery industry, it is a common practice to define the cycle life of a battery as the number of charge-discharge cycles that the battery suffers 20% decay in capacity based on the initial capacity measured after the required electrochemical formation. Summarized in Table 3 below are the cycle life data of a broad array of batteries featuring presently disclosed elastomer-encapsulated anode active material particles vs. other types of anode active materials.

TABLE 3

Cycle life data of various lithium secondary (rechargeable) batteries.

| Sample ID | Protective means; 1-25% graphene | Type & % of anode active material | Initial capacity (mAh/g) | Cycle life (No. of cycles) |
|---|---|---|---|---|
| Si-1 | SBR-encapsulation, 2% Gn | 25% by wt. Si nanoparticles (80 nm) + 67% graphite + 8% binder | 1,120 | 1,320-1,665 |
| Si-2 | Carbon encapsulation | 25% by wt. Si nanoparticles (80 nm) | 1,242 | 251 |
| SiNW-1 | Urea-Urethane encapsulation, 5% Gn | 35% Si nanowires (diameter = 90 nm) | 1,258 | 1,544 |
| SiNW-2 | ethylene oxide-epichlorohydrin copolymer, 8% Gn | 45% Si nanoparticles, prelithiated or non-prelithiated (no pre-Li) | 1,766 | 1,455 (prelithiated); 1,188 (no prelithiation) |
| $VO_2$-1 | Polyurethane encapsulation, 3% Gn | 90%-95%, $VO_2$ nanoribbon | 255 | 1755 |
| $Co_3O_4$-2 | Polyisoprene encapsulation, 10% Gn | 85% $Co_3O_4$ + 8% graphite platelets + binder | 720 | 2,388 (Prelithiated); 1,723 (no pre-Li) |
| $Co_3O_4$-2 | No encapsulation | 85% $Co_3O_4$ + 8% graphite platelets + binder | 725 | 266 |
| $SnO_2$-2 | polybutadiene encapsulation, 2% Gn | 75% $SnO_2$ particles (3 µm initial size) | 740 | 1,245 |
| $SnO_2$-2 | EPDM encapsulation, 7% Gn | 75% $SnO_2$ particles (87 nm in diameter) | 738 | 3,266 (Pre-Li); 1,866 (non pre-Li) |
| Ge-1 | butyl rubber encapsulation of C-coated Ge, 2% Gn | 85% Ge + 8% graphite platelets + binder | 850 | 1,245 |
| Ge-2 | Carbon-coated | 85% Ge + 8% graphite platelets + binder | 856 | 120 |
| Al-Li-1 | Polyurethane encapsulation, 25% Gn | Al/Li alloy (3/97) particles | 2,850 | 1,666 |
| Al-Li-2 | None | Al/Li alloy particles | 2,856 | 155 |
| Zn-Li-1 | Cis-polyisoprene encapsulation, 1% Gn | C-coated Zn/Li alloy (5/95) particles | 2,626 | 1,420 |
| Zn-Li-2 | None | C-coated Zn/Li alloy (5/95) particles | 2,631 | 146 |

These data further confirm the following:
(1) The graphene/elastomer encapsulation strategy is surprisingly effective in alleviating the anode expansion/shrinkage-induced capacity decay problems.
(2) The encapsulation of high-capacity anode active material particles by carbon or other non-elastomeric protective materials does not provide much benefit in terms of improving cycling stability of a lithium-ion battery
(3) Prelithiation of the anode active material particles prior to graphene/elastomer encapsulation is beneficial.
(4) The graphene/elastomer encapsulation strategy is also surprisingly effective in imparting stability to lithium metal or its alloy when used as the anode active material of a lithium metal battery.

We claim:
1. An anode active material layer for a lithium battery, said anode active material layer comprising multiple particulates of an anode active material, wherein a particulate is composed of one or a plurality of particles of an anode active material being encapsulated by a thin layer of graphene/elastomer composite having from 0.01% to 50% by weight of graphene sheets dispersed in an elastomeric matrix material based on the total weight of the graphene/elastomer composite, wherein said encapsulating thin layer of graphene/elastomer composite has a thickness from 1 nm to 10 µm, a fully recoverable tensile strain from 2% to 500%, a lithium ion conductivity from $10^{-7}$ S/cm to $10^{-2}$ S/cm, and an electrical conductivity from $10^{-7}$ S/cm to 100 S/cm when measured at room temperature wherein said elastomeric matrix material contains a material selected from natural polyisoprene, synthetic polyisoprene, polybutadiene, chloroprene rubber, polychloroprene, butyl rubber, nitrile rubber, ethylene propylene rubber, ethylene propylene diene rubber, metallocene-based poly(ethylene-co-octene) elastomer, poly(ethylene-co-butene) elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide- epichlorohydrin copolymer, polyurethane, urethane-urea copolymer, or a combination thereof.

2. The anode active material layer of claim 1, wherein said graphene sheets are selected from pristine graphene, graphene oxide, reduced graphene oxide, graphene fluoride, graphene chloride, nitrogenated graphene, hydrogenated graphene, doped graphene, functionalized graphene, or a combination thereof.

3. The anode active material layer of claim 1, wherein said graphene sheets comprise single-layer graphene or few-layer graphene, wherein said few-layer graphene is defined as a graphene platelet formed of less than 10 graphene planes.

4. The anode active material layer of claim 1, wherein said graphene sheets have a length or width from 5 nm to 5 µm.

5. The anode active material layer of claim 1, wherein said anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof.

6. The anode active material layer of claim 5, wherein said Li alloy contains from 0.1% to 10% by weight of a metal element selected from Zn, Ag, Au, Mg, Ni, Ti, Fe, Co, V, or a combination.

7. The anode active material layer of claim 1, wherein said anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, lithium titanate, or a combination thereof, wherein $1 \leq x \leq 2$.

8. The anode active material layer of claim 1, wherein said anode active material is in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

9. The anode active material layer of claim 8, wherein said anode active material has a dimension less than 20 nm.

10. The anode active material layer of claim 1, wherein said one or a plurality of particles is coated with a layer of carbon disposed between said one or said plurality of particles and said graphene/elastomer composite layer.

11. The anode active material layer of claim 1, wherein said particulate further contains a graphite or carbon material therein.

12. The anode active material layer of claim 11, wherein said graphite or carbon material is selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof.

13. The anode active material layer of claim 8, wherein said nanoparticle, nanowire, nanofiber, nanotube, nanosheet, nanobelt, nanoribbon, nanodisc, nanoplatelet, or nanohorn is coated with or embraced by a conductive protective coating selected from a carbon material, electronically conductive polymer, conductive metal oxide, or conductive metal coating.

14. The anode active material layer of claim 8, wherein said nanoparticle, nanowire, nanofiber, nanotube, nanosheet, nanobelt, nanoribbon, nanodisc, nanoplatelet, or nanohorn is pre-intercalated or pre-doped with lithium ions to form a prelithiated anode active material having an amount of lithium from 0.1% to 54.7% by weight of said prelithiated anode active material.

15. The anode active material layer of claim 1, wherein said graphene/elastomer composite further contains from 0.1% to 40% by weight of a lithium ion-conducting additive dispersed in said elastomeric matrix material.

16. The anode active material layer of claim 15, wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0 \leq x \leq 1$, $1 \leq y \leq 4$.

17. The anode active material layer of claim 1, wherein said elastomeric matrix material contains a mixture or blend of an elastomer and an electron-conducting polymer selected from polyaniline, polypyrrole, polythiophene, polyfuran, a bi-cyclic polymer, a sulfonated derivative thereof, or a combination thereof.

18. The anode active material layer of claim 1, wherein said elastomeric matrix material contains a mixture or blend of an elastomer and a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazenes, polyvinyl chloride, polydimethylsiloxane, poly(vinylidene fluoride)-hexafluoropropylene (PVDF-HFP), a sulfonated derivative thereof, or a combination thereof.

19. A lithium battery containing an optional anode current collector, the anode active material layer as defined in claim 1, a cathode active material layer, an optional cathode current collector, an electrolyte in ionic contact with said anode active material layer and said cathode active material layer, and an optional porous separator disposed between said anode active material layer and said cathode active material layer.

20. The lithium battery of claim 19, which is a lithium-ion battery, lithium metal battery, lithium-sulfur battery, lithium-selenium battery, or lithium-air battery.

* * * * *